(12) United States Patent
Choi

(10) Patent No.: US 11,253,819 B2
(45) Date of Patent: Feb. 22, 2022

(54) PRODUCTION OF THIN FILM COMPOSITE HOLLOW FIBER MEMBRANES

(71) Applicant: Saudi Arabian Oil Company, Dhahran (SA)

(72) Inventor: Seung-Hak Choi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 98 days.

(21) Appl. No.: 16/874,423

(22) Filed: May 14, 2020

(65) Prior Publication Data
US 2021/0354091 A1 Nov. 18, 2021

(51) Int. Cl.
B01D 69/08 (2006.01)
B01D 63/02 (2006.01)
B01D 71/60 (2006.01)

(52) U.S. Cl.
CPC .......... *B01D 69/08* (2013.01); *B01D 63/023* (2013.01); *B01D 71/60* (2013.01); *B01D 2323/42* (2013.01)

(58) Field of Classification Search
CPC ...... B01D 69/08; B01D 63/023; B01D 71/60; B01D 2323/42
See application file for complete search history.

(56) References Cited

U.S. PATENT DOCUMENTS

| | | |
|---|---|---|
| 880,404 A | 2/1908 | Sanford |
| 1,591,264 A | 7/1926 | Baash |
| 1,789,993 A | 1/1931 | Switzer |
| 1,896,482 A | 2/1933 | Crowell |
| 1,949,498 A | 3/1934 | Frederick et al. |
| 2,121,002 A | 6/1938 | Baker |
| 2,121,051 A | 6/1938 | Ragan et al. |
| 2,187,487 A | 1/1940 | Burt |
| 2,189,697 A | 2/1940 | Baker |
| 2,222,233 A | 11/1940 | Mize |

(Continued)

FOREIGN PATENT DOCUMENTS

| | | |
|---|---|---|
| AU | 636642 | 5/1993 |
| AU | 2007249417 | 11/2007 |

(Continued)

OTHER PUBLICATIONS

Adamczak et al., "Preparation of polymeric membranes by in situ interfacial polymerization", International Journal of Polymer Science 2019 (2019), doi/10.1155/2019/6217924, 14 pages.

(Continued)

*Primary Examiner* — Krishnan S Menon
(74) *Attorney, Agent, or Firm* — Fish & Richardson P.C.

(57) ABSTRACT

System, devices, and method for the production of thin film composite hollow fiber membranes on a hollow fiber support structure. The system includes a comb and roller device, or comb and dual roller device, which can be used to define a submerged travel path in a first solution bath for a hollow fiber. The combs and rollers control the amount of time the hollow fiber spends in the first solution. The first solution contains a first monomer, and the hollow fiber is impregnated with the first monomer. The amount of impregnation depends on the time spent in the first solution. Subsequent immersion in a second solution containing a second monomer results in the formation of a thin film composite hollow fiber membrane.

27 Claims, 8 Drawing Sheets

(56) References Cited

U.S. PATENT DOCUMENTS

| | | | |
|---|---|---|---|
| 2,286,075 A | 6/1942 | Evans | |
| 2,304,793 A | 12/1942 | Bodine | |
| 2,316,402 A | 4/1943 | Canon | |
| 2,327,092 A | 8/1943 | Botkin | |
| 2,411,260 A | 11/1946 | Glover et al. | |
| 2,546,978 A | 4/1951 | Collins et al. | |
| 2,672,199 A | 3/1954 | McKenna | |
| 2,707,998 A | 5/1955 | Baker et al. | |
| 2,728,599 A | 12/1955 | Moore | |
| 2,751,010 A | 6/1956 | Trahan | |
| 2,881,838 A | 4/1959 | Morse et al. | |
| 2,912,053 A | 11/1959 | Bruekelman | |
| 2,912,273 A | 11/1959 | Chadderdon et al. | |
| 2,915,127 A | 12/1959 | Abendroth | |
| 2,965,175 A | 12/1960 | Ransom | |
| 2,965,177 A | 12/1960 | Le Bus et al. | |
| 3,075,242 A | 1/1963 | Emil | |
| 3,116,799 A | 1/1964 | Lemons | |
| 3,147,536 A | 9/1964 | Lamphere | |
| 3,225,828 A | 12/1965 | Wisenbaker et al. | |
| 3,369,603 A | 2/1968 | Trantham | |
| 3,381,748 A | 5/1968 | Peters et al. | |
| 3,382,925 A | 5/1968 | Jennings | |
| 3,667,721 A | 6/1972 | Vujasinovic | |
| 3,897,038 A | 7/1975 | Le Rouax | |
| 3,915,426 A | 10/1975 | Le Rouax | |
| 4,030,354 A | 6/1977 | Scott | |
| 4,042,019 A | 8/1977 | Henning | |
| 4,059,155 A | 11/1977 | Greer | |
| 4,099,699 A | 7/1978 | Allen | |
| 4,190,112 A | 2/1980 | Davis | |
| 4,222,977 A | 9/1980 | Dobo | |
| 4,229,154 A | 10/1980 | Chaban, Jr. et al. | |
| 4,254,983 A | 3/1981 | Harris | |
| 4,276,931 A | 7/1981 | Murray | |
| 4,296,822 A | 10/1981 | Ormsby | |
| 4,317,729 A | 3/1982 | Yamashita et al. | |
| 4,346,006 A * | 8/1982 | Kopp | B29C 66/83415 210/321.62 |
| 4,349,071 A | 9/1982 | Fish | |
| 4,362,677 A | 12/1982 | Yamashita et al. | |
| 4,391,326 A | 7/1983 | Greenlee | |
| 4,407,367 A | 10/1983 | Kydd | |
| 4,412,130 A | 10/1983 | Winters | |
| 4,413,642 A | 11/1983 | Smith et al. | |
| 4,422,948 A | 12/1983 | Corley et al. | |
| 4,430,219 A | 2/1984 | Kuzumoto et al. | |
| 4,467,996 A | 8/1984 | Baugh | |
| 4,482,514 A * | 11/1984 | Schindler | B01D 71/56 264/41 |
| 4,538,684 A | 9/1985 | Sheffield | |
| 4,546,043 A | 10/1985 | Yoshimoto et al. | |
| 4,562,888 A | 1/1986 | Collet | |
| 4,603,578 A | 8/1986 | Stoltz | |
| 4,631,162 A | 12/1986 | Yoshimoto et al. | |
| 4,696,502 A | 9/1987 | Desai | |
| 4,743,189 A | 5/1988 | Samuelson | |
| 4,772,391 A | 9/1988 | Baker et al. | |
| 4,820,460 A | 4/1989 | Repetti et al. | |
| 4,830,640 A | 5/1989 | Nakamura et al. | |
| 4,834,184 A | 5/1989 | Streich et al. | |
| 4,850,847 A | 7/1989 | Samuelson | |
| 4,861,661 A | 8/1989 | Samuelson | |
| 4,869,321 A | 9/1989 | Hamilton | |
| 4,898,245 A | 2/1990 | Braddick | |
| 4,902,422 A | 2/1990 | Pinnau et al. | |
| 4,915,886 A | 4/1990 | Repetti et al. | |
| 4,938,902 A | 7/1990 | Nakamura et al. | |
| 4,941,812 A | 7/1990 | Samelson | |
| 4,950,391 A | 8/1990 | Weickhardt | |
| 4,953,617 A | 9/1990 | Ross et al. | |
| 4,980,061 A | 12/1990 | Tadros et al. | |
| 4,990,165 A | 2/1991 | Bikson | |
| 5,012,863 A | 5/1991 | Springer | |
| 5,049,167 A | 9/1991 | Castro et al. | |
| 5,069,793 A | 12/1991 | Kaschemakat et al. | |
| 5,084,349 A * | 1/1992 | Sasaki | B01D 69/02 210/500.21 |
| 5,102,484 A | 4/1992 | Allen et al. | |
| 5,117,909 A | 6/1992 | Wilton et al. | |
| 5,129,956 A | 7/1992 | Christopher et al. | |
| 5,151,227 A * | 9/1992 | Nguyen | B01D 67/0016 264/179 |
| 5,176,208 A | 1/1993 | Lalande et al. | |
| 5,197,547 A | 3/1993 | Morgan | |
| 5,242,636 A | 9/1993 | Sluma et al. | |
| 5,295,541 A | 3/1994 | Ng et al. | |
| 5,330,000 A | 7/1994 | Givens et al. | |
| 5,330,348 A | 7/1994 | Aneja et al. | |
| 5,356,461 A | 10/1994 | Sluma et al. | |
| 5,358,048 A | 10/1994 | Brooks | |
| 5,368,889 A | 11/1994 | Johnson et al. | |
| 5,439,626 A | 8/1995 | Bennett et al. | |
| 5,489,382 A * | 2/1996 | Tatebe | B01D 69/08 210/321.89 |
| 5,507,346 A | 4/1996 | Gano et al. | |
| 5,556,589 A | 9/1996 | Sibal | |
| 5,580,114 A | 12/1996 | Palmer | |
| 5,598,874 A * | 2/1997 | Alei | B01D 63/021 139/1 R |
| 5,604,036 A | 2/1997 | Price et al. | |
| 5,643,660 A | 7/1997 | Price et al. | |
| 5,678,635 A | 10/1997 | Dunlap et al. | |
| 5,707,584 A | 1/1998 | Terpstra et al. | |
| 5,783,079 A | 7/1998 | Kumano | |
| 5,833,001 A | 11/1998 | Song et al. | |
| 5,833,896 A | 11/1998 | Jacobs et al. | |
| 5,837,033 A | 11/1998 | Giglia et al. | |
| 5,842,518 A | 12/1998 | Soybel et al. | |
| 5,924,489 A | 7/1999 | Hatcher | |
| 5,944,101 A | 8/1999 | Hearn | |
| 6,138,764 A | 10/2000 | Scarsdale et al. | |
| 6,247,542 B1 | 6/2001 | Kruspe et al. | |
| 6,276,452 B1 | 8/2001 | Davis et al. | |
| 6,371,204 B1 | 4/2002 | Singh et al. | |
| 6,491,108 B1 | 12/2002 | Slup et al. | |
| 6,521,025 B1 | 2/2003 | Shilton et al. | |
| 6,551,088 B2 | 4/2003 | Nguyen et al. | |
| 6,595,289 B2 | 7/2003 | Tumlin et al. | |
| 6,623,637 B1 | 9/2003 | Monzen et al. | |
| 6,630,069 B2 | 10/2003 | Sakashita et al. | |
| 6,660,377 B2 | 12/2003 | Bernaschek | |
| 6,688,386 B2 | 2/2004 | Cornelssen | |
| 6,768,106 B2 | 7/2004 | Gzara et al. | |
| 6,797,209 B2 | 9/2004 | Travelute et al. | |
| 6,805,730 B2 | 10/2004 | Herczeg | |
| 6,808,023 B2 | 10/2004 | Smith et al. | |
| 6,899,178 B2 | 5/2005 | Tubel | |
| 6,913,084 B2 | 7/2005 | Boyd | |
| 7,001,664 B2 | 2/2006 | Travelute et al. | |
| 7,049,272 B2 | 5/2006 | Sinclair et al. | |
| 7,096,950 B2 | 8/2006 | Howlett et al. | |
| 7,117,956 B2 | 10/2006 | Grattan et al. | |
| 7,172,075 B1 * | 2/2007 | ji | B01D 69/08 210/490 |
| 7,188,674 B2 | 3/2007 | McGavem, III et al. | |
| 7,188,675 B2 | 3/2007 | Reynolds | |
| 7,231,975 B2 | 6/2007 | Lavaure et al. | |
| 7,249,633 B2 | 7/2007 | Ravensbergen et al. | |
| 7,284,611 B2 | 10/2007 | Reddy et al. | |
| 7,398,832 B2 | 7/2008 | Brisco | |
| 7,405,182 B2 | 7/2008 | Verrett | |
| 7,424,909 B2 | 9/2008 | Roberts et al. | |
| 7,488,705 B2 | 2/2009 | Reddy et al. | |
| 7,490,725 B2 | 2/2009 | Pinnau et al. | |
| 7,497,260 B2 | 3/2009 | Telfer | |
| 7,591,305 B2 | 9/2009 | Brookey et al. | |
| 7,600,572 B2 | 10/2009 | Slup et al. | |
| 7,712,527 B2 | 5/2010 | Roddy | |
| 7,762,323 B2 | 7/2010 | Frazier | |
| 7,802,621 B2 | 9/2010 | Richards et al. | |
| 7,934,552 B2 | 5/2011 | La Rovere | |
| 7,965,175 B2 | 6/2011 | Yamano | |
| 8,002,049 B2 | 8/2011 | Keese et al. | |

(56) References Cited

U.S. PATENT DOCUMENTS

| | | |
|---|---|---|
| 8,069,916 B2 | 12/2011 | Giroux et al. |
| 8,104,624 B2 | 1/2012 | Chidambaran et al. |
| 8,376,051 B2 | 2/2013 | McGrath et al. |
| 8,424,688 B2 | 4/2013 | Chidambaran et al. |
| 8,453,724 B2 | 6/2013 | Zhou |
| 8,491,716 B2 | 7/2013 | Cho et al. |
| 8,496,055 B2 | 7/2013 | Mootoo et al. |
| 8,579,024 B2 | 11/2013 | Mailand et al. |
| 8,726,983 B2 | 5/2014 | Khan |
| 8,770,276 B1 | 7/2014 | Nish et al. |
| 8,871,140 B2 | 10/2014 | Cho et al. |
| 8,899,338 B2 | 12/2014 | Elsayed et al. |
| 9,109,305 B2 | 8/2015 | Choi et al. |
| 9,109,433 B2 | 8/2015 | DiFoggio et al. |
| 9,133,671 B2 | 9/2015 | Kellner |
| 9,156,003 B2 | 10/2015 | Kelada |
| 9,211,503 B2 | 12/2015 | Xiao et al. |
| 9,212,532 B2 | 12/2015 | Leuchtenberg et al. |
| 9,234,302 B2 | 1/2016 | Weber et al. |
| 9,234,394 B2 | 1/2016 | Wheater et al. |
| 9,353,220 B2 | 5/2016 | Savariar et al. |
| 9,359,861 B2 | 6/2016 | Burgos |
| 9,410,066 B2 | 8/2016 | Ghassemzadeh |
| 9,416,617 B2 | 8/2016 | Wiese et al. |
| 9,427,699 B2 | 8/2016 | Mayer et al. |
| 9,551,200 B2 | 1/2017 | Read et al. |
| 9,574,417 B2 | 2/2017 | Laird et al. |
| 9,657,213 B2 | 5/2017 | Murphy et al. |
| 10,087,752 B2 | 1/2018 | Bedouet |
| 9,976,407 B2 | 5/2018 | Ash et al. |
| 10,280,706 B1 | 5/2019 | Sharp, III |
| 10,301,898 B2 | 5/2019 | Orban |
| 2002/0053428 A1 | 5/2002 | Maples |
| 2002/0173209 A1 | 11/2002 | Travelute et al. |
| 2003/0047312 A1 | 3/2003 | Bell |
| 2003/0118763 A1 | 6/2003 | Travelute et al. |
| 2003/0132224 A1 | 7/2003 | Spencer |
| 2004/0050250 A1 | 3/2004 | Pinnau et al. |
| 2004/0086594 A1 | 5/2004 | Bernaschek |
| 2005/0037196 A1 | 2/2005 | Travelute et al. |
| 2005/0077243 A1 | 4/2005 | Pinnau et al. |
| 2005/0167097 A1 | 8/2005 | Sommers et al. |
| 2007/0137528 A1 | 6/2007 | Le Roy-Delage et al. |
| 2007/0181304 A1 | 8/2007 | Rankin et al. |
| 2008/0236841 A1 | 10/2008 | Howlett et al. |
| 2008/0251253 A1 | 10/2008 | Lumbye |
| 2009/0115078 A1 | 5/2009 | Leister |
| 2009/0194290 A1 | 8/2009 | Parks et al. |
| 2009/0250220 A1 | 10/2009 | Stamoulis |
| 2009/0277837 A1 | 11/2009 | Liu et al. |
| 2010/0221522 A1* | 9/2010 | Mrozinski .......... B01D 67/0018 428/315.5 |
| 2010/0270018 A1 | 10/2010 | Howlett |
| 2011/0036570 A1 | 2/2011 | La Rovere et al. |
| 2011/0056681 A1 | 3/2011 | Khan |
| 2011/0067869 A1 | 3/2011 | Bour et al. |
| 2011/0168411 A1 | 7/2011 | Braddick |
| 2011/0198287 A1 | 8/2011 | Dukes et al. |
| 2011/0259609 A1 | 10/2011 | Hessels et al. |
| 2011/0278021 A1 | 11/2011 | Travis et al. |
| 2011/0290709 A1* | 12/2011 | Ohno .......... B01D 71/68 210/321.8 |
| 2011/0308707 A1 | 12/2011 | Montoya |
| 2012/0012335 A1 | 1/2012 | White et al. |
| 2012/0118571 A1 | 5/2012 | Zhou |
| 2012/0125850 A1 | 5/2012 | Fujimura et al. |
| 2012/0151890 A1 | 6/2012 | Pearson |
| 2012/0170406 A1 | 7/2012 | DiFoggio et al. |
| 2012/0304862 A1 | 12/2012 | Taylor |
| 2013/0105391 A1 | 5/2013 | Friese |
| 2013/0240207 A1 | 9/2013 | Frazier |
| 2013/0296199 A1 | 11/2013 | Ghassemzadeh |
| 2014/0076793 A1 | 3/2014 | Ryu |
| 2014/0291887 A1* | 10/2014 | Coan .......... B01D 71/68 264/203 |
| 2015/0060364 A1 | 3/2015 | McCutcheon et al. |
| 2015/0241139 A1 | 8/2015 | McGinnis |
| 2015/0265972 A1 | 9/2015 | Roesink |
| 2016/0237810 A1 | 8/2016 | Beaman et al. |
| 2016/0281458 A1 | 9/2016 | Greenlee |
| 2016/0288058 A1 | 10/2016 | Tai et al. |
| 2016/0303521 A1 | 10/2016 | Chakraborty et al. |
| 2016/0305215 A1 | 10/2016 | Harris et al. |
| 2017/0036171 A1 | 2/2017 | Liehard |
| 2017/0044864 A1 | 2/2017 | Sabins et al. |
| 2017/0058628 A1 | 3/2017 | Van Wijk et al. |
| 2017/0067313 A1 | 3/2017 | Connell et al. |
| 2017/0333835 A1 | 11/2017 | Sano |
| 2017/0341017 A1 | 11/2017 | Dutta |
| 2018/0057974 A1* | 3/2018 | Iwai .......... D01D 5/24 |
| 2018/0187498 A1 | 7/2018 | Soto et al. |
| 2018/0243783 A1 | 8/2018 | Marschke et al. |
| 2018/0245427 A1 | 8/2018 | Jimenez et al. |
| 2019/0009207 A1 | 1/2019 | Choi et al. |
| 2019/0024473 A1 | 1/2019 | Arefi |
| 2019/0049017 A1 | 2/2019 | McAdam |
| 2019/0187015 A1 | 6/2019 | Sugita |
| 2019/0316424 A1 | 10/2019 | Robinchaux et al. |

FOREIGN PATENT DOCUMENTS

| | | |
|---|---|---|
| CA | 2734032 | 6/2016 |
| CN | 100411721 | 11/2006 |
| CN | 101658763 | 3/2010 |
| DK | 2236742 | 8/2017 |
| EP | 586559 | 3/1994 |
| EP | 767259 | 4/1997 |
| EP | 3595801 | 1/2020 |
| GB | 2392183 | 2/2004 |
| GB | 2453279 | 1/2009 |
| GB | 2492663 | 1/2014 |
| JP | 6418407 | 1/1989 |
| JP | 6422308 | 1/1989 |
| JP | 227030 | 8/1992 |
| JP | 3250644 | 10/1996 |
| JP | H08281085 | 10/1996 |
| JP | H0938474 | 2/1997 |
| JP | 2001190936 | 7/2001 |
| JP | 2001040566 | 2/2011 |
| KR | 20140059560 | 5/2014 |
| KR | 20160001142 | 1/2016 |
| KR | 101648843 | 8/2016 |
| WO | 1989012728 | 12/1989 |
| WO | 2002090711 | 11/2002 |
| WO | 2010132807 | 11/2010 |
| WO | 2012164023 | 12/2012 |
| WO | WO 2013146796 | 10/2013 |
| WO | WO 2014104124 | 7/2014 |
| WO | 2014177697 | 11/2014 |
| WO | 2017099671 | 6/2017 |
| WO | 2018167221 | 9/2018 |
| WO | 2019001069 | 1/2019 |
| WO | 2019132877 | 7/2019 |

OTHER PUBLICATIONS

Bruton et al., "Whipstock Options for Sidetracking," Oilfield Review, vol. 26, No. 1, Spring 2014, 10 pages.

Chou et al., "Characteristics and potential applications of a novel forward osmosis hollow fiber membrane," Desalination vol. 261, 2010, 8 pages.

Collins English Dictionary, Complete and Unabridged, "Spacer," Harper Collins Publishers 12th Edition, 2014, 1 page.

Culfaz et al., "Microstructured hollow fibers for ultrafiltration," Journal of Membrane Science, vol. 347, Issue 1-2, Feb. 1, 2010, 10 pages.

Ekiner et al., "Polyamide hollow fibers for hydrogen/methane separation spinning and properties", Journal of Membrane Science, vol. 53, 1990, 15 pages.

Fang et al., "Interracially polymerized composite nanofiltration hollow fiber membranes for low-pressure water softening", Journal of Membrane Science 430 (2013) 129-139.

(56) References Cited

OTHER PUBLICATIONS

Ingole et al., "Synthesis, characterization and surface modification of PES hollow fiber membrane support with polydopamine and thin film composite for energy generation", Chemical Engineering Journal 243 (2014) 137-146, 10 pages.

Khulbe et al., "Thin-film composite and/or thin film nanocomposite hollow fiber membrane for water treatment, pervaporation, and gas/vapor separation", Polymers 10 (2018) 1051, 22 pages.

Lau et al., "A recent progress in thin film composite membrane: A review," Desalination vol. 287, 2012, 11 pages.

Lau et al., "Progress in interfacial polymerization technique on composite membrane preparation" 2011 2nd International Conference on Environmental Engineering and Applications, 5 pages.

Liu et al., "Fabrication of a high-flux thin film composite hollow fiber nanofiltration membrane for wastewater treatment", Journal of Membrane Science 478 (2015) 25-36, 12 pages.

Louie et al., "Gas and liquid permeation properties of modified interfacial composite reverse osmosis membranes," Journal of Membrane Science, vol. 325, pp. 793-800, Dec. 2008, 8 pages.

Maruf, et al, "Influence of substrate processing and interfacial polymerization conditions on the surface topography and permselective properties of surface-patterned thin-film composite membranes", Journal of Membrane Science 512 (2016) 50-60, 11 pages.

Mat et al., "Hollow fiber membrane modules," Current Opinion in Chemical Engineering vol. 4, May 2014, 7 pages.

Mohammadi et al., "Gas separation by silicone-coated dry asymmetric aromatic polyamide membranes", Gas Separation and Purification, vol. 9, No. 3, 1995, 7 pages.

Moradi et al., "Using PDMS coated TFC-RO membranes for $CO_2/N_2$ gas separation: Experimental study, modeling and optimization," Polymer Testing, vol. 56, Dec. 1, 2016, 12 pages.

Nijdam et al., "High performance micro-engineered hollow fiber membranes by smart sinneret design," Journal of Membrane Science, vol. 256, Issue 1-2, Jul. 1, 2005, 7 pages.

Peterson et al., "Novel polyamide composite membranes for gas separation prepared by interfacial polycondensation", Journal of Applied Polymer Science, vol. 63, Issue 12, 1996, 7 pages.

Scribd [online], "Milling Practices and Procedures," retrieved from URL <https://www.scribd.com/document/358420338/Milling-Rev-2-Secured>, 80 pages.

Sridhar et al., "Gas permeation properties of polyamide membrane prepared by interfacial polymerization", Journal of Material Science, vol. 42, 2007, 10 pages.

Tam International Inflatable and Swellable Packers, "TAM Scab Liner brochure," Tam International, available on or before Nov. 15, 2016, 4 pages.

Wan et al., "Thin-film composite hollow fiber membrane with inorganic salt additives for high mechanical strength and high power density for pressure-retarded osmosis", Journal of Membrane Science 555 (2018) 388-397, 34 pages.

Wang et al., "Characterization of novel forward osmosis hollow fiber membranes," Journal of Membrane Science vol. 355, 2010, 10 pages.

Yang et al., "Novel designs for improving the performance of hollow fiber membrane distillation modules," Journal of Membrane Science vol. 384, Nov. 15, 2011, 11 pages.

Yang et al., "Optimization of microstructural hollow fiber design for membrane distillation applications using CFD modeling," Journal of Membrane Science vol. 421-422, Dec. 1, 2012, 54 pages.

Yasukawa et al., "Preparation of a forward osmosis membrane using a highly porous polyketone microfiltration membrane as a novel support", Journal of Membrane Science 487 (2015) 51-59, 9 pages.

Zhou et al., "Interfacial polymerization on PES hollow fiber membranes using mixed diamines for nanofiltration removal of salts containing oxyanions and ferric ions", Desalination 394 (2016) 176-184, 9 pages.

PCT International Search Report and Written Opinion in International Appln. No. PCT/US2021/032216, dated Jul. 30, 2021, 14 pages.

* cited by examiner

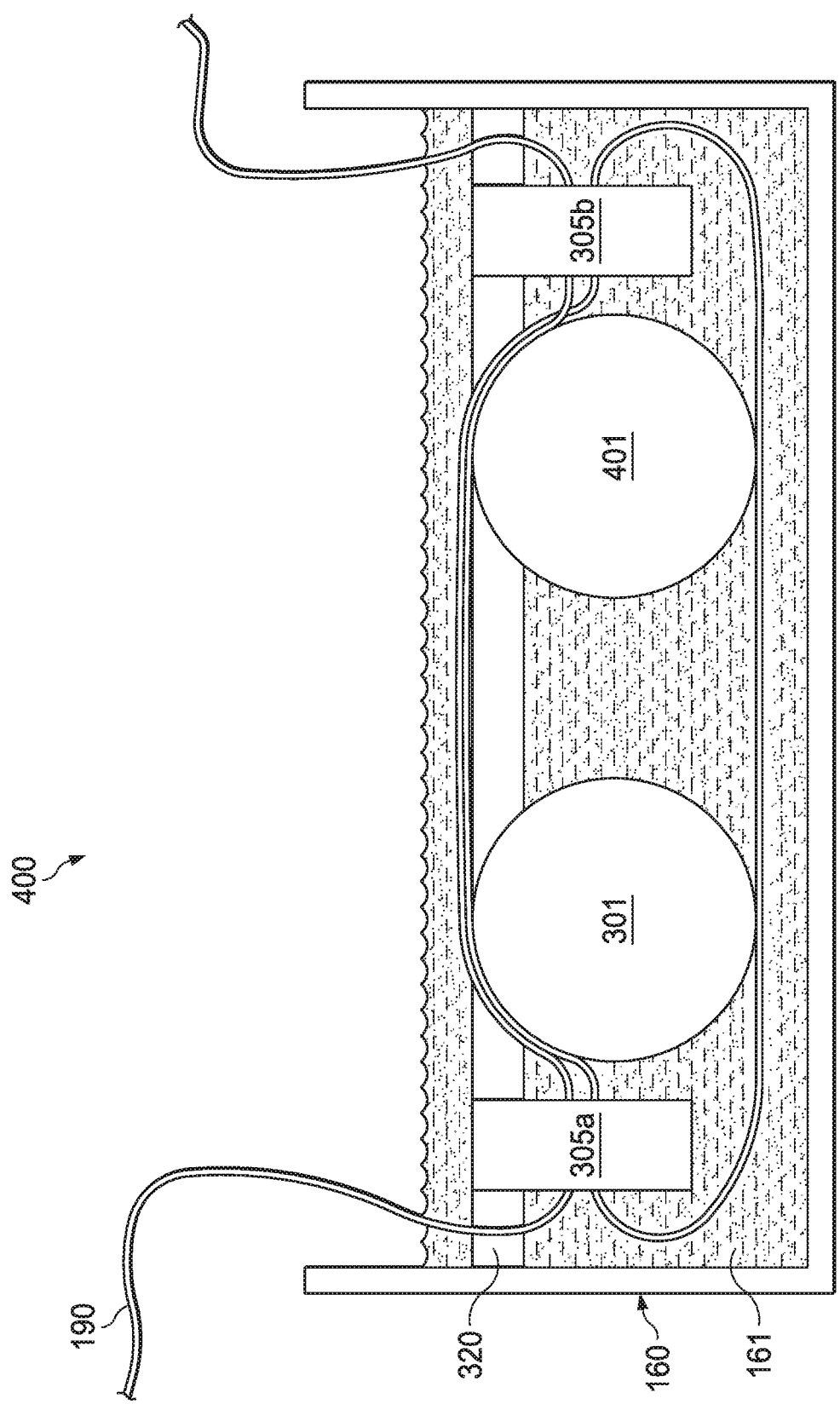

PRODUCTION OF THIN FILM COMPOSITE HOLLOW FIBER MEMBRANES

TECHNICAL FIELD

This document relates to thin film composite membranes.

BACKGROUND

Thin film composite membranes are semipermeable membranes. These membranes can be used in purification and separation processes such as water purification, including nanofiltration and reverse osmosis. These membranes can also be used in gas separations, for example, helium extraction and hydrogen recovery from natural gas processing. These membranes can be planar or hollow fiber structures that separate two environments of phases. These membranes can be manufactured using interfacial polymerization.

SUMMARY

This disclosure describes a method and apparatus for forming thin film membranes on a hollow fiber.

The following units of measure have been mentioned in this disclosure:

| Unit of Measure | Full form |
|---|---|
| cm | centimeter |
| mm | millimeter |
| nm | nanometer |
| μm | micrometer |
| ° C. | degree Celsius |
| RPM | rotations per minute |
| STP | standard temperature and pressure |
| GPU | gas permeation unit |
| mmHg | millimeters mercury |

In some implementations, an apparatus for directing a hollow fiber through a solution bath includes a roller suspended on a shaft, where the roller is at least partially submerged in the solution bath. A hollow fiber is connected to the roller, and the roller is configured to rotate to drive or permit movement of the hollow fiber through the solution bath. The apparatus can include a solution bath motor, connected to the shaft and configured to rotate the roller at a variable speed. The apparatus can include a first comb. The first comb includes a first base and a plurality of first pins. The first pins are arranged on the first base to define a plurality of first gaps between the first pins. The apparatus can include a second comb. The second comb includes a second base and a plurality of second pins. The second pins are arranged on the second base to define a plurality of second gaps between the pins. The first comb and the second comb are positioned in the solution bath on opposite sides of the roller. The roller, the first comb, and the second comb are positioned in the solution bath so that the hollow fiber can be directed through a repetitive circular path inside the solution bath.

This aspect, taken alone or combinable with any other aspect, can include the following features. The repetitive circular path can be defined by a movement through the first comb, over the roller, through the second comb, and under the roller. The first comb, the roller, and the second comb can be configured so that the hollow fiber can be passed i) through an unoccupied first gap in the first comb, ii) over the roller, iii) through an unoccupied second gap in the second comb, iv) under the roller, v) optionally repeatedly through steps i) to iv), then vi) over the roller and through a final unoccupied second gap in the second comb, and vii) out of the solution bath.

This aspect, taken alone or combinable with any other aspect, can include the following features. The roller can be a first roller and the apparatus can include a second roller suspended on a second shaft. The second roller can be at least partially submerged in the solution bath. The second roller can be configured to rotate to drive or permit movement of the hollow fiber through the solution bath. The second roller can be positioned in the solution bath between the first comb and the second comb.

This aspect, taken alone or combinable with any other aspect, can include the following features. The second shaft can be connected to the solution bath motor by a timing belt. The solution bath motor and the timing belt can be configured to rotate the second roller at the same speed as the first roller.

This aspect, taken alone or combinable with any other aspect, can include the following features. The apparatus can include a guide rail mounted to an inside wall of the solution bath. The guide rail can be configured to provide a first attachment point for the first comb and a second attachment point for the second comb. The first attachment point and the second attachment point can be movable along the guide rail.

In some implementations, a system for creating thin film composite hollow fiber membranes includes a series of transfer rollers configured to direct a hollow fiber through a series of baths. The series of baths includes a first solution bath configured to hold a first solution. The first solution bath can include a solution bath roller. The solution bath roller can be at least partially submerged in the first solution. The first solution bath can include a solution bath motor. The solution bath roller can be connected to the solution bath motor by a shaft. The solution bath motor can be configured to rotate the solution bath roller. The first solution bath can include a first comb. The first comb includes a first base and a plurality of first pins. The first pins are arranged on the first base to define a plurality of first gaps between the first pins. The first solution bath can include a second comb. The second comb includes a second base and a plurality of second pins. The second pins are arranged on the second base to define a plurality of second gaps between the second pins. The first comb and the second comb can be positioned on opposite sides of the solution bath roller. The solution bath roller, the first comb, and the second comb can be positioned in the solution bath so that the hollow fiber can be directed through a repetitive circular path inside the solution bath. The series of baths can include a second solution bath configured to hold a second solution.

This aspect, taken alone or combinable with any other aspect, can include the following features. The repetitive circular path can be defined by a movement through the first comb, over the solution bath roller, through the second comb, and under the solution bath roller. The first comb, the solution bath roller, and the second comb can be configured so that the hollow fiber can be passed i) through an unoccupied first gap in the first comb, ii) over the solution bath roller, iii) through an unoccupied second gap in the second comb, iv) under the solution bath roller, v) optionally repeatedly through steps i) to iv), then vi) over the solution bath roller and through a final unoccupied second gap in the second comb, and vii) out of the first solution bath.

This aspect, taken alone or combinable with any other aspect, can include the following features. The solution bath roller can be a first solution bath roller and the system can include a second solution bath roller suspended on a second shaft. The second solution bath roller can be least partially submerged in the first solution. The second solution bath roller can be configured to rotate to drive or permit movement of the hollow fiber through the first solution bath. The second solution bath roller can be positioned in the solution bath between the first comb and the second comb.

This aspect, taken alone or combinable with any other aspect, can include the following features. The second shaft can be connected to the solution bath motor by a timing belt. The solution bath motor can be configured to rotate the second solution bath roller at the same speed as the first solution bath roller.

This aspect, taken alone or combinable with any other aspect, can include the following features. The system can include an excess solution removal device between the first solution bath and the second solution bath. The excess solution removal device can be configured to remove excess first solution from the hollow fiber before the hollow fiber is directed into the second solution bath.

This aspect, taken alone or combinable with any other aspect, can include the following features. The series of baths can include a first water bath configured to hold water and a second water bath configured to hold water. The first water bath can be positioned in the system so that hollow fiber is directed into the first water bath before being directed into the first solution bath. The second water bath can be positioned in the system so that the hollow fiber is directed into the second water bath after the hollow fiber is directed into the second solution bath.

This aspect, taken alone or combinable with any other aspect, can include the following features. The first water bath can include a hollow fiber roller. The hollow fiber roller can be at least partially submerged in the water in the first water bath. The first water bath can include a hollow fiber roller shaft. The hollow fiber roller can be attached to the hollow fiber roller shaft. The first water bath can include a water bath motor. The water bath motor can be configured to rotate the hollow fiber roller.

This aspect, taken alone or combinable with any other aspect, can include the following features. The second water bath can include a product roller. The product roller can be at least partially submerged in the water in the second water bath. The second water bath can include a product roller shaft. The product roller can be attached to the product roller shaft. The second water bath can include a second water bath motor. The second water bath motor can be configured to rotate the product roller.

This aspect, taken alone or combinable with any other aspect, can include the following features. The system can include one or more tension controllers configured to adjust a speed of the solution bath motor in response to a change in tension of the hollow fiber.

This aspect, taken alone or combinable with any other aspect, can include the following features. The tension controller can be a dancing tension controller. The dancing tension controller can be connected to a resistor. The resistor can be configured to send a signal to the solution bath motor to control the speed of the solution bath motor in response to a change in tension of the hollow fiber.

This aspect, taken alone or combinable with any other aspect, can include the following features. The system can include a drying device configured to dry the hollow fiber after the hollow fiber has passed through the second solution bath.

In some implementations, a method of forming a thin film composite hollow fiber membrane on a hollow fiber includes providing a first solution bath comprising a first solution, and defining a repetitive circular travel path by a movement of the hollow fiber in the first solution using a first comb, a second comb, and a solution bath roller. The first comb includes a first base and a plurality of first pins. The first pins define a plurality of first gaps between the first pins. The second comb includes a second base and a plurality of second pins. The second pins define a plurality of second gaps between the second pins. The first comb and the second comb can be positioned in the first solution bath on opposite sides of the solution bath roller. The method can include directing the hollow fiber through the repetitive circular travel path and impregnating an outer surface of the hollow fiber with a first monomer present in the first solution. Directing the hollow fiber through the repetitive circular travel path can include i) passing the hollow fiber through an unoccupied first gap in the first comb, ii) passing the hollow fiber over the solution bath roller, iii) passing the hollow fiber through an unoccupied second gap in the second comb, iv) passing the hollow fiber under the solution bath roller, v) optionally repeating steps i) through iv), then vi) passing the hollow fiber over the roller and through a final unoccupied second gap in the second comb. The method can include directing the hollow fiber through a second solution bath comprising a second solution. The second solution can include a second monomer. The method can include reacting the first monomer impregnated in the hollow fiber with the second monomer to generate a thin film composite hollow fiber membrane.

This aspect, taken alone or combinable with any other aspect, can include the following features. Passing the hollow fiber over the solution bath roller can include passing the hollow fiber over a first solution bath roller and over a second solution bath roller. Passing the hollow fiber under the solution bath roller can include passing the hollow fiber under a first solution bath roller and under a second solution bath roller.

This aspect, taken alone or combinable with any other aspect, can include the following features. Impregnating the outer surface of the hollow fiber with a first monomer present in the first solution can include impregnating the outer surface of the hollow fiber with a monomeric arylene polyamine.

This aspect, taken alone or combinable with any other aspect, can include the following features. Impregnating the outer surface of the hollow fiber with a monomeric arylene polyamine can include impregnating the outer surface of the hollow fiber with 1,3-phenylenediamine.

This aspect, taken alone or combinable with any other aspect, can include the following features. Directing the hollow fiber through a second bath including a second solution can include directing the hollow fiber through a second solution comprising an acyl halide.

This aspect, taken alone or combinable with any other aspect, can include the following features. Directing the hollow fiber through a second solution including an acyl halide can include directing the hollow fiber through a second solution comprising 1,3,5-benzenetricarbonyl trichloride.

This aspect, taken alone or combinable with any other aspect, can include the following features. The method can include submerging the hollow fiber in a first water bath before directing the hollow fiber through the first solution bath.

This aspect, taken alone or combinable with any other aspect, can include the following features. The method can include directing the hollow fiber through an excess first solution removal device prior to directing the hollow fiber through the second solution bath.

This aspect, taken alone or combinable with any other aspect, can include the following features. The method can include maintaining tension in the hollow fiber using at least one dancing tension controller and a solution bath motor connected to the solution bath roller. The solution bath motor can be configured to rotate the solution bath roller. The dancing tension controller can be configured to send a signal to the solution bath motor in response to a change in tension in the hollow fiber. The solution bath motor can adjust the speed of the rotation of the solution bath roller in response to the signal.

This aspect, taken alone or combinable with any other aspect, can include the following features. The method can include directing the hollow fiber through an air drying tower after reacting the first monomer with the second monomer.

This aspect, taken alone or combinable with any other aspect, can include the following features. The method can include submerging the thin film composite hollow fiber membrane in a second water bath.

The details of one or more implementations of the disclosure are set forth in the accompanying drawings and the description that follows. Other features, objects, and advantages of the disclosure will be apparent from the description and drawings, and from the claims.

DESCRIPTION OF DRAWINGS

FIG. 4A shows an example schematic of a cross sectional side view of a second device to control the impregnation of a first monomer on a hollow fiber membrane.

Like reference symbols in the various drawings indicate like elements.

DETAILED DESCRIPTION

Figure 1:
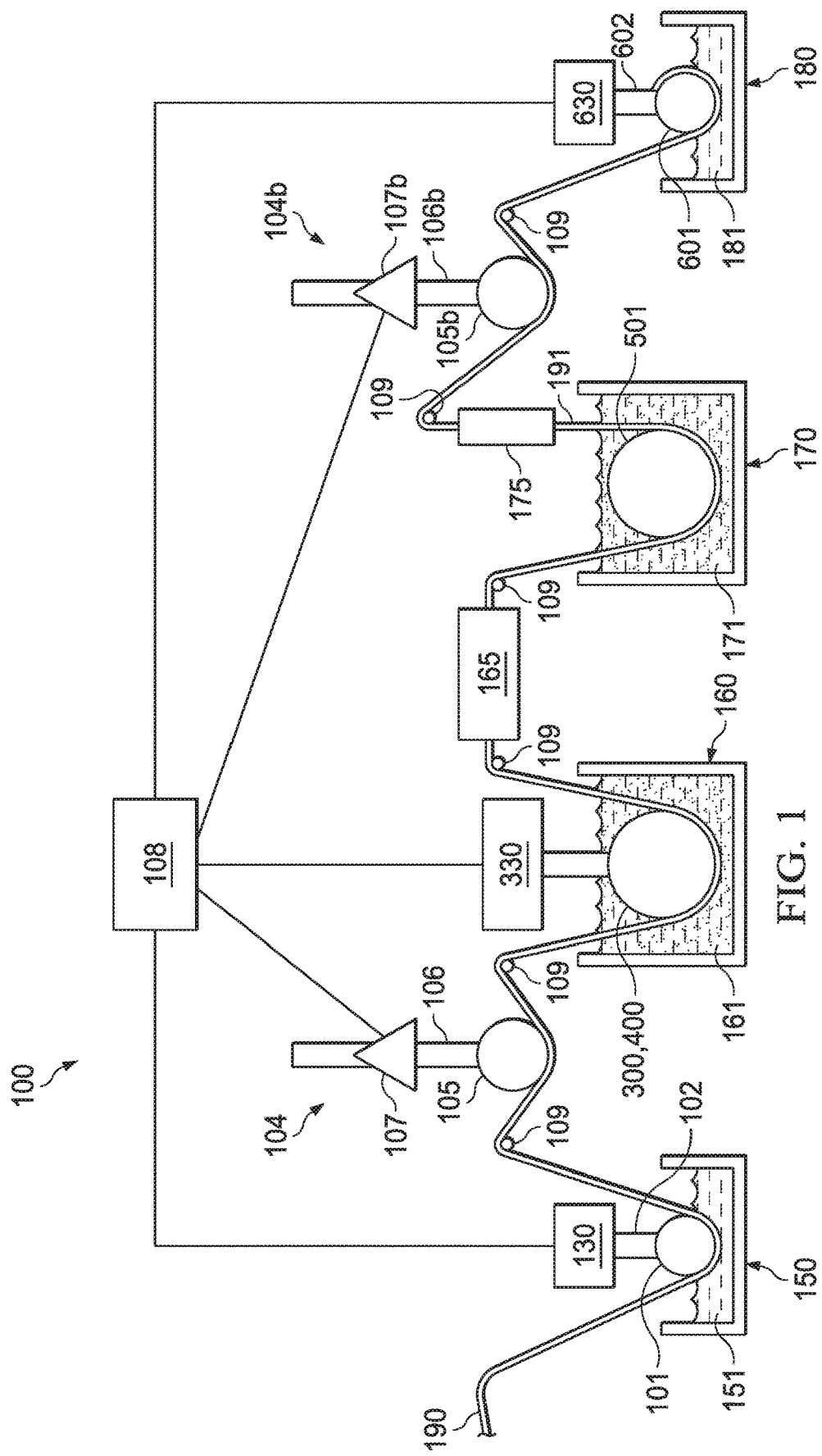
FIG. 1 shows an example schematic of a system for the formation of thin film composite hollow fiber membranes.

Provided in this disclosure, in part, are methods and an apparatus for the production of thin film composite hollow fiber membranes. One method of producing thin film composite membranes is interfacial polymerization. In interfacial polymerization, a first monomer is impregnated on a support structure. The impregnated support structure is then exposed to a second monomer. A reaction between the first and second monomers results in a thin film on the surface of the support structure. In some implementations, the first monomer and second monomer are dissolved separately in two immiscible liquids, and the reaction between the two solutions occurs at the interface of the two solutions. As the polymerization reaction proceeds, the interfacial film becomes a barrier that slows further reaction. Accordingly, the membranes formed by interfacial polymerization are generally ultrathin, for example, less than 500 nm in thickness. In some implementations, the first monomer can be a monomeric arylene polyamine in an aqueous solution. The second monomer can be an acyl halide. For example, interfacial polymerization can occur as the reaction between 1,3-phenylenediamine (m-PDA) and 1,3,5-benzenetricarbonyl trichloride (TMC) in n-hexane, resulting in a polyamide layer.

The two solutions containing the first monomer and the second monomer can be held in separate baths, and the support structure can be immersed in a first bath containing the first monomer, followed by immersion in a second bath containing the second monomer. Membrane performance of the resultant membrane is determined by the position, thickness, and uniformity of the formed polyamide layer, which are affected by the amount and depth of the first monomer on the support structure.

In some implementations, the support structure is a hollow fiber, and interfacial polymerization can be used to produce a thin film composite hollow fiber membrane. The hollow fiber can be any polymeric hollow fiber, for example, polysulfone, polyacrylonitrile, polyethersulfone, polyimides, or polyetherimides.

In some implementations, a system for the production of thin film composite hollow fiber membranes includes a bath of the first solution, a bath of the second solution, and mechanisms to pass the hollow fiber through the first and second solutions sequentially. In some implementations, the system includes a first water bath, a first solution bath, a second solution bath, and a second water bath. The hollow fiber is passed along a series of transfer rollers 109 between baths. The speed of the fiber is controlled by the motors in the system as well as the dancing tension controllers, described in more detail below. The transfer rollers 109 can be drums, cylinders, bobbins, or wheels, and can be configured to spin freely to allow the hollow fiber 190 to pass through the system. The transfer rollers 109 are configured to have a smooth surface such that the hollow fiber does not stick to the surface or catch on surface irregularities. In some implementations, the transfer rollers 109 are made of a non-reactive or non-corrosive material. For example, the transfer rollers 109 can be made of stainless steel, high density plastic.

FIG. 1 shows an example schematic of a system 100 that can produce thin film composite hollow fiber membranes by interfacial polymerization on a hollow fiber. In some implementations, the hollow fiber 190 is first immersed in a first water bath 150. The hollow fiber 190 then continues to the first solution bath 160, which contains the first solution 161. Immersion in the first solution 161 impregnates the hollow fiber 190 with the first monomer. The hollow fiber continues to the second solution bath 170, which contains the second solution 171. Immersion in the second solution reacts the first monomer with the second monomer, generating the thin film composite hollow fiber membrane 191. In some implementations, the thin film composite hollow fiber membrane continues to a second water bath 180. Each bath is configured to hold a liquid, for example water or a solution. The baths can be any structure capable of holding a liquid, for example, a basin, bucket, bowl or box. The baths can be made from a non-corrosive and non-reactive material, for example, stainless steel. The baths can be sufficiently impermeable the liquids. The baths can include a bottom and sides, and may be open at the top. The baths can include a drain to allow used liquid to be drained and new liquid to be added. Details on each of these baths and their contributions to the interfacial polymerization process are described in more detail below.

The system 100 that can produce thin film composite hollow fiber membranes by interfacial polymerization on a hollow fiber. Suitable fibers include fibers that include polysulfone, polyacrylonitrile, polyethersulfone, polyimides, or polyetherimides. Suitable fibers can include polyether ether ketone (PEEK), polyvinylidene difluoride (PVDF), polypropylene (PP) and polyethylene (PE). The pore size of the hollow fiber is in the range of 10 nm to 10 μm. For example, the pore size can be between 10 nm and 1 μm. The outer diameter of the fiber can depend on the subsequent application of the thin film composite hollow fiber membrane. The outer diameter of thin film composite hollow fiber membranes for use in nanofiltration, reverse osmosis, or gas separation can be in the range of 80 μm to 1.5 mm, for example between 80 μm and 500 μm. In some applications, the ratio of the outer diameter to the inner diameter (OD/ID) of the hollow fiber is between 1.2 and 3.0, for example between 1.8 and 2.5. These ratios ensure that the fiber is mechanically stable and resistant to pressure. In some implementations, the system 100 includes a first water bath 150. The first water bath 150 allows newly synthesized hollow fibers support structures to be used directly in the interfacial polymerization process. For example, certain techniques to produce a mesoporous hollow fiber implement a spinning process in which, after spinning, a series of solvent exchange steps are used to prepare the fiber for drying and storage. However, by implementing the techniques described in this disclosure, the solvent exchange steps can be eliminated by maintaining the hollow fiber in the water-wet state and proceeding directly to interfacial polymerization. Eliminating the solvent exchange step is achieved by the first water bath 150, which also allows the hollow fiber to be used directly after fabrication, thus streamlining, simplifying, and improving the productivity of the overall process.

In some implementations, the system 100 includes a hollow fiber roller 101 that is used to maintain the hollow fiber 190 in the wet state in the first water bath 150, prior to interfacial polymerization. The hollow fiber roller 101 can be a drum, cylinder, bobbin, wheel, or other mechanism for winding the hollow fiber 190. The hollow fiber 190 can be wound around the hollow fiber roller 101, and rotation of the hollow fiber roller 101 will wind or unwind the hollow fiber 190 from the hollow fiber roller 101. The hollow fiber roller 101 is configured to rotate on a shaft 102 driven by a first motor 130. In some implementations, the shaft 102 passes through the wall of the first solution bath. The shaft 102 can be configured to be at a height, relative to the bottom of the bath 150, such that the hollow fiber support roller 101 is partially or completely submerged when the bath is filled with water 151. Partial or complete submersion in the first water bath can maintain the hollow fiber 190 in the wet state prior to interfacial polymerization.

The rotation of the hollow fiber roller 101 is driven by a first motor 130. Rotation of the hollow fiber roller 101 allows the hollow fiber 190 to unwind from the hollow fiber roller 101. The system can include additional motors, for example a solution bath motor 330, and third motor 630. The solution bath motor 330 is configured to rotate a first roller 301 in the first solution bath 160. The third motor 630 is configured to rotate a product roller 630. The first motor 130 has controllable speed and can be configured to turn at the same speed as the additional motors in the system, for example, the solution bath motor 330 and the third motor 630. The speed of all of the motors in the system can be controlled by dancing tension controllers, discussed in more detail below. In some implementations, the first motor 130, solution bath motor 330, and third motor 630 are configured to rotate at different speeds. The movement of the hollow fiber 190 through the system is driven by the movement of the rollers. For example, the rotation of the product roller 601 pulls the fiber through the system. In addition, friction between the rollers and the hollow fiber 190 helps drive the movement of the hollow fiber through the system.

Figure 2:
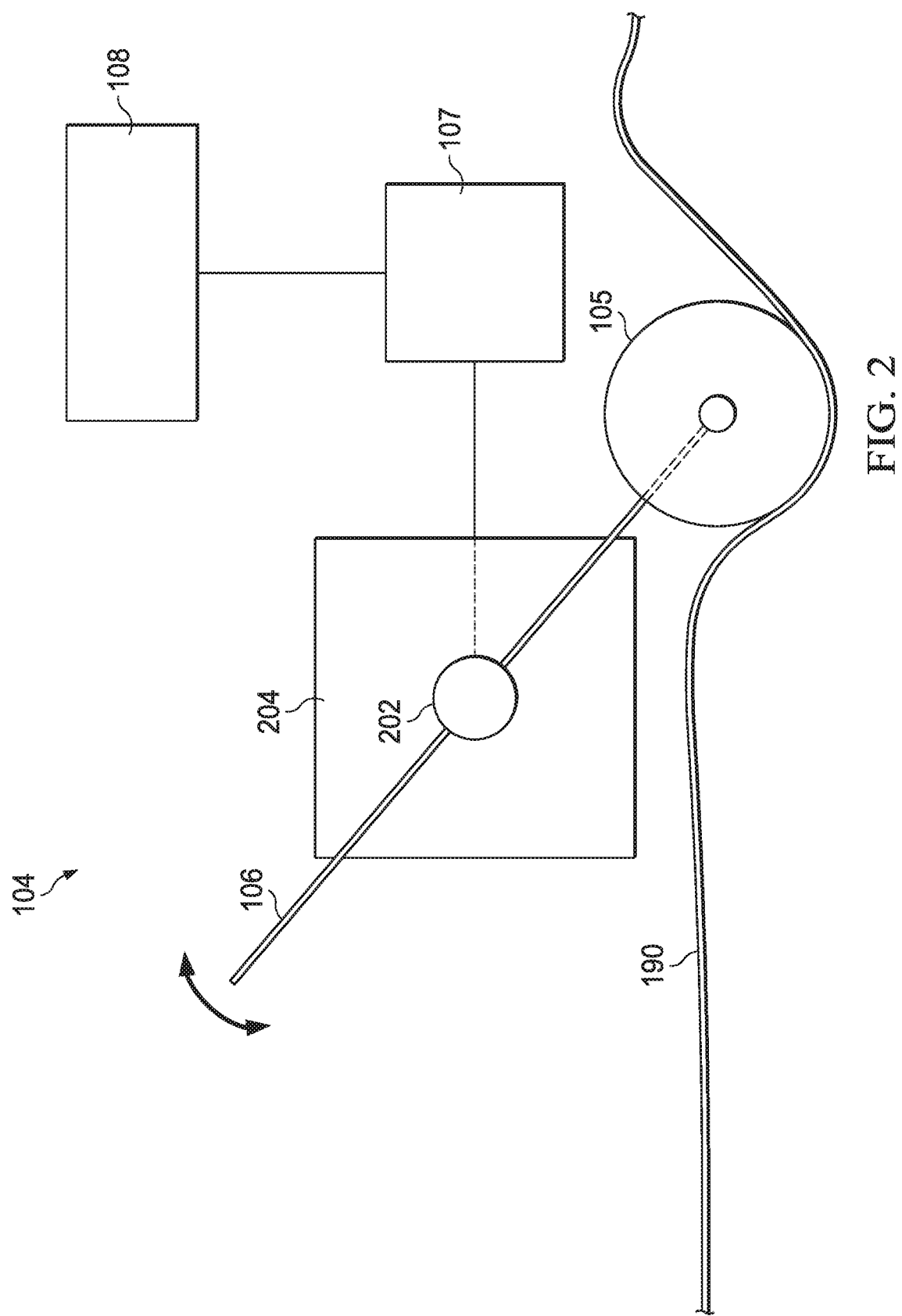
FIG. 2 shows an example schematic of a dancing tension controller.

FIG. 2 shows an example schematic of a tension controller 104. The tension controller 104 includes a tension control roller 105 that is connected to a tension shaft 106. The hollow fiber 190 can pass under or over the tension control roller 105. The tension control roller 105 can spin freely about its center axis, where it is joined to a first end of the tension shaft 106. The tension shaft 106 is connected at a pivot point 202 that passes through a support base 204 and is connected to a resistor 107. During operation of the system, the hollow fiber 190 passes over or under the roller 105, and an increase or decrease in the tension of the hollow fiber 190 on the roller 105 will shift the roller and pivot the shaft 106. The resistor 107 is configured to sense the movement of the shaft. The resistor 107 is configured to send a signal to a controller 108 in response to the movement of the shaft 106. The controller 108 is configured to adjust the speed of the motors in the system in response to the signal from the resistor 107. The tension controller 104 therefore ensures that the tension on the hollow fiber remains constant or at an appropriate amount of tension to pull the hollow fiber 190 along the travel path without damaging the hollow fiber 190. Multiple tension controllers 104 may be placed throughout the travel path.

The hollow fiber 190 can then pass over another transfer roller 109 or multiple transfer rollers 109. The transfer rollers 109 are configured to direct the hollow fiber 190 into the first solution bath 160. The first solution bath 160 contains the first solution 161. The first solution 161 includes the first monomer. In some implementations, the first monomer is a monomeric arylene polyamine in aqueous solution, for example aqueous 1,3-phenylenediamine. The hollow fiber 190 is immersed in the first solution 161. Immersion in the first solution 161 results in the impregnation of the outer surface of the hollow fiber 190 with the first monomer. The immersion of the hollow fiber, including the travel path through the first solution 161, is controlled by the use of a comb and roller system 300 or 400. Controlling the immersion time allows for precise control of the amount and depth of impregnation of the first monomer on the hollow fiber 190. The comb and roller systems 300 or 400 can be coupled to the solution bath motor 330. The solution bath motor 330 can rotate the rollers in these devices at the same speed. The speed of the solution bath motor 330 can be controlled by the controller 108.

Figure 3A:
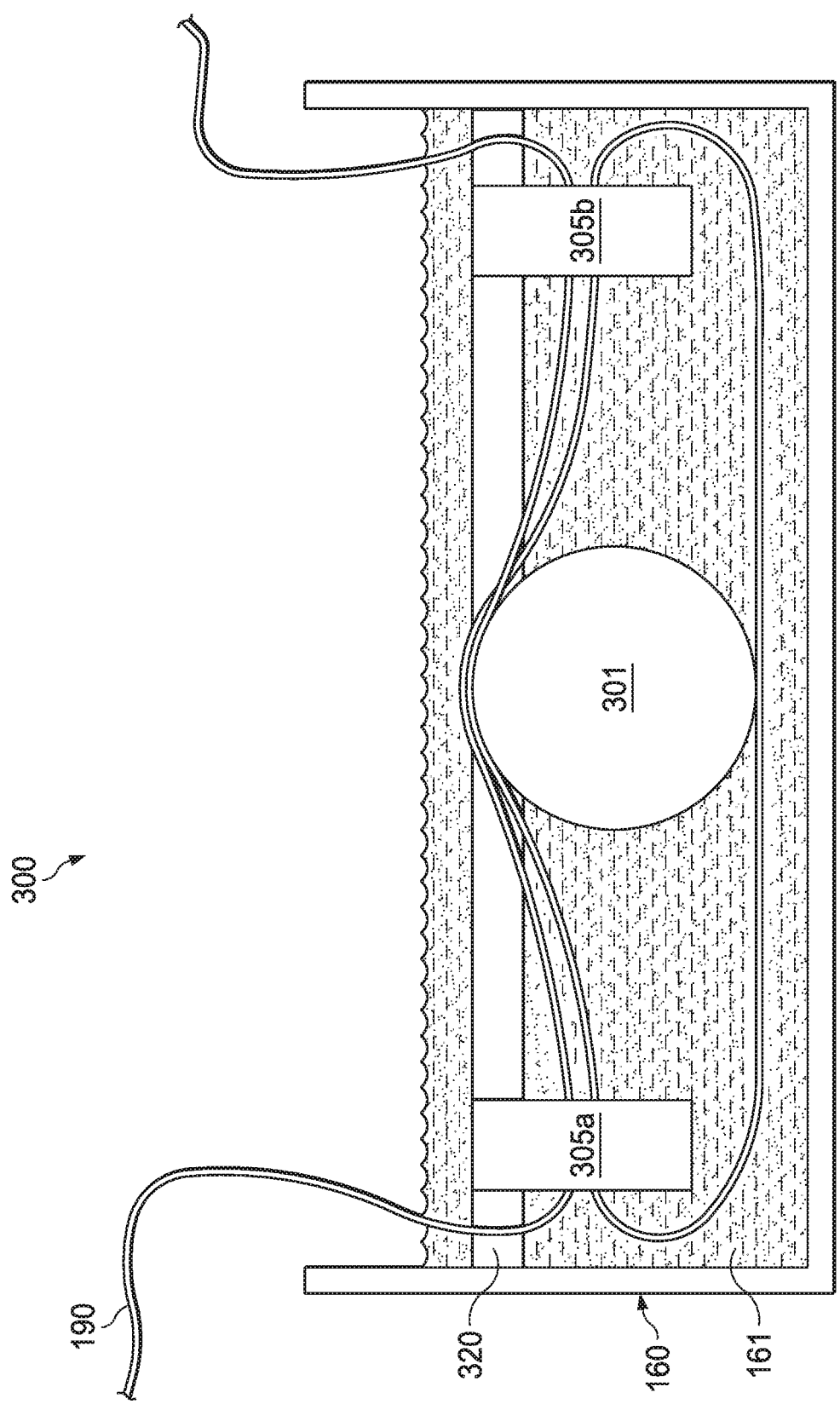
FIG. 3A shows an example schematic of a cross sectional side view of a first device to control the impregnation of a first monomer on a hollow fiber.

FIG. 3A shows an example schematic of a cross sectional side view of a comb and roller system 300. The comb and roller system is configured to create a submerged travel path for the hollow fiber 190 through the first solution 161, for example, a path where the hollow fiber 190 travels back and forth inside the first solution bath 160. The system 300 contains a roller 301. The roller 301 can have any diameter suitable to be partially or fully submerged in the first solution bath 160. The length of the travel path for the hollow fiber can be adjusted by modifying the size of the roller, the rotation speed of the roller 301, or adjusting travel path to control immersion time. The roller is configured to have a smooth surface such that the hollow fiber does not stick to the surface or catch on surface irregularities. In some implementations, the roller is made of a non-reactive or non-corrosive material. For example, the rollers can be made of stainless steel, high density plastic, or another material that does not react with the solution in the solution bath. In some implementations, the system also includes combs 305a and 305b, which assist in defining the travel path through the first solution 161. The combs are placed on opposite sides of the roller 301. Each comb includes a base 306 and a plurality of pins 308 perpendicular to the base. Each comb can include an attachment piece 310, for example an arm of the comb that is attached perpendicularly to the base. The combs 305a and 305b can be held in place by attachment to a guide rail 320. The guide rail can be fastened to the side of the bath. One or more grips can be mounted to the guide rail. The grips can be configured to hold a comb. The grip can include a solid body with a slot configured to receive the attachment piece 310. The grip can then be tightened around the attachment piece 310, for example by tightening screws that pass through the body of the grip into the slot. The grip can be mounted on the guide rail. For example, the guide rail can pass through a hollow passage in the grip body. Accordingly, the grip can slide along the guide rail, adjusting the position of the grip and the comb. When the grip is in the desired location, it can be locked into place, for example, by tightening screws that pass through the body of the grip into the hollow passage. This allows for the distance between the combs, and accordingly, the length of the travel path, to be adjusted.

Figure 3B:
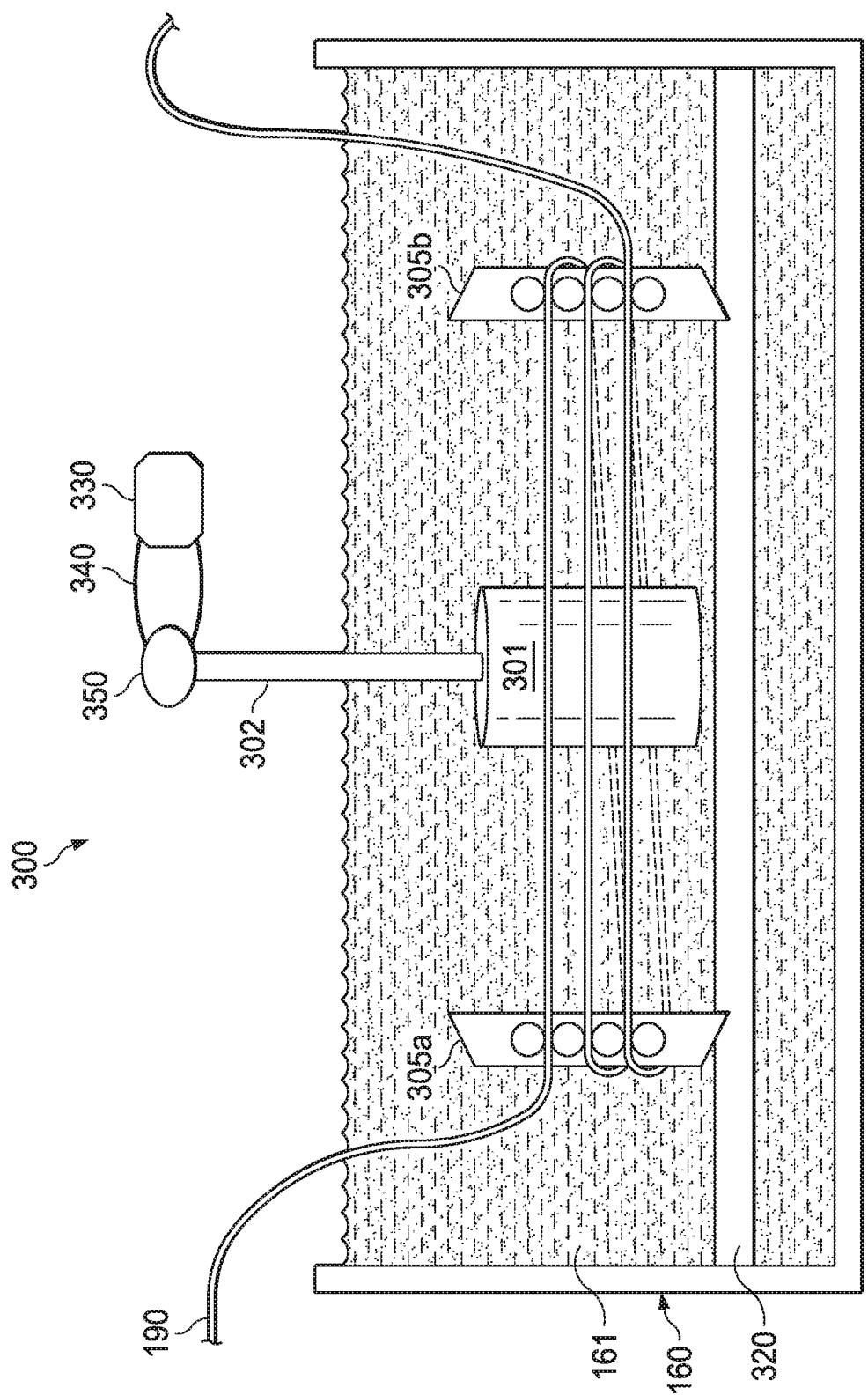
FIG. 3B shows an example schematic of a top down view of a first device to control the impregnation of a first monomer on a hollow fiber.

FIG. 3B shows an example schematic of a top view of a comb and roller system 300. The roller 301 rotates on a shaft 302. In some implementations, the shaft passes through the wall of the first solution bath. The shaft can be configured to be at a height, relative to the bottom of the bath, such that the roller 301 is partially or completely submerged when the bath is filled with first solution 161. The shaft can be connected to a solution bath motor 330. In some implementations, the shaft is connected directly to the motor. In some implementations, the shaft 302 is connected to a pulley 350. The pulley 350 is connected to the solution bath motor 330 by a timing belt 340. In some implementations, the speed of the first solution bath motor is controlled by feedback from the dancing tension controller 104.

In some implementations, the comb and roller system 300 includes one or more combs 305a and 305b. The combs can be made of a non-reactive or non-corrosive material. For example, the combs can be made of stainless steel, high density plastic, or another material that does not react with the solution in the solution bath.

Figure 3C:
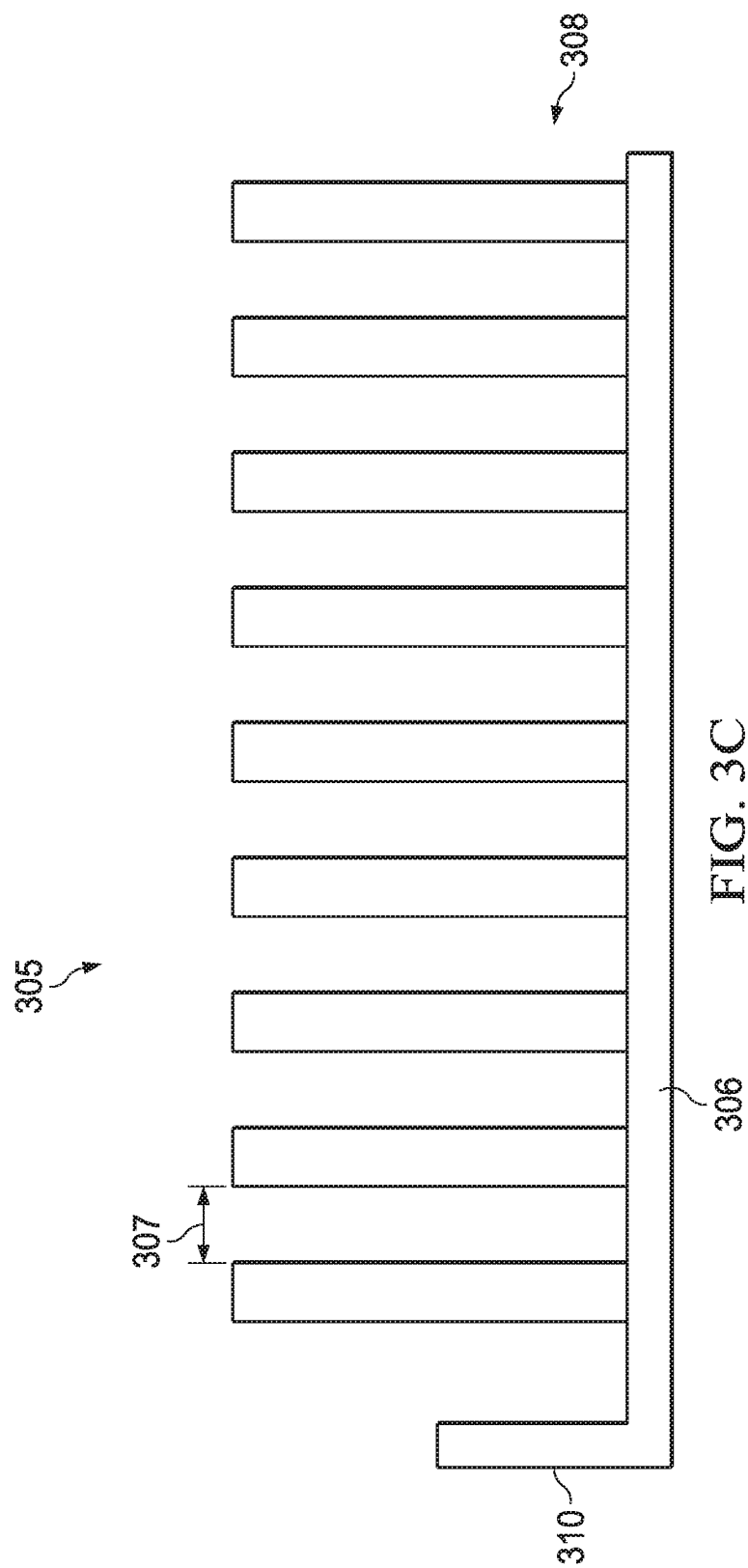
FIG. 3C shows an example of a comb used in the first and second devices.

FIG. 3C is a schematic of a front view of an example comb, for example, comb 305a or comb 305b. Each comb includes a base 306a or 306b, and a series of pins 308a or 308b. The pins are arranged perpendicularly to the base and evenly spaced along the base, creating gaps 307a and 307b between the pins. The combs also include an attachment piece 310 that can attach to a guide rail 320. As described above, the attachment piece 310 can be an arm that fits in a corresponding grip on the guide rail. The grip can be tightened to hold the comb in place. The grip can be, at variable positions along the guide rail, such that the attachment position can be adjusted, lengthening or shortening the distance between the combs. The combs can be placed in the bath such that the combs are at least partially submerged when the bath is filled and at least part of the gaps between the pins are submerged.

The combs are used to define a travel path through the first solution 161. The hollow fiber 190 can be threaded in a first direction through a first gap 307a between first pins 308a in the first comb 305a, over the top of the roller 301, through an unoccupied second gap 307b in a second comb 305b, under the roller 301 in a second direction substantially opposite to the first direction, and then through a different, unoccupied first gap 307a in the first comb 305a. This threading pattern can continue over the roller and through the combs. This allows for the hollow fiber 190 to travel back and forth multiple times through the first solution 161. The pins 308 function, for example, to keep the hollow fiber 190 from contacting itself or tangling as it passes back and forth through the first solution 161. The pins 308 are configured to have a smooth surface in order to prevent the hollow fiber 190 from sticking to the pins and to allow the hollow fiber 190 pass easily through the gaps 307. The pins and combs therefore ensure that the hollow fiber is evenly coated and does not snare or tangle during the interfacial polymerization process.

In some implementations, the fiber passes through each gap 307 in the combs sequentially, which represents the longest travel path. In some implementations, the travel path is shortened by threading the hollow fiber 190 through fewer than each of gaps in the combs. Accordingly, the travel path can be lengthened or shortened as desired. The amount of first monomer impregnated in the hollow fiber is proportional to the length of the travel path. A longer travel path will result in a greater amount of first monomer impregnated in the hollow fiber. In addition, the speed of the motors in the system can be adjusted. A faster motor speed will result in less time spent in the baths, decreasing the amount of the first monomer impregnated and the depth of impregnation in the hollow fiber 190. A slower motor speed will increase the amount of time spent in the baths, increasing the amount of first monomer impregnated and the depth of impregnation in the hollow fiber 190. This system 300 of combs, rollers, and motors allows for the control of impregnation of the first monomer.

FIG. 4A shows an example schematic of a cross-sectional side view of a comb and dual roller system 400 that contains a first roller 301 and a second roller 401. The comb and dual roller system 400 is configured to create a submerged travel path for the hollow fiber 190 through the first solution 161, for example a path where the hollow fiber 190 travels back and forth inside the first solution bath 160. The comb and dual roller system includes a first roller 301 and a second roller 401. The first roller 301 is as described in system 300. The second roller 401 is substantially the same as roller 301, but placed at a different location in the first solution bath 160.

Figure 4B:
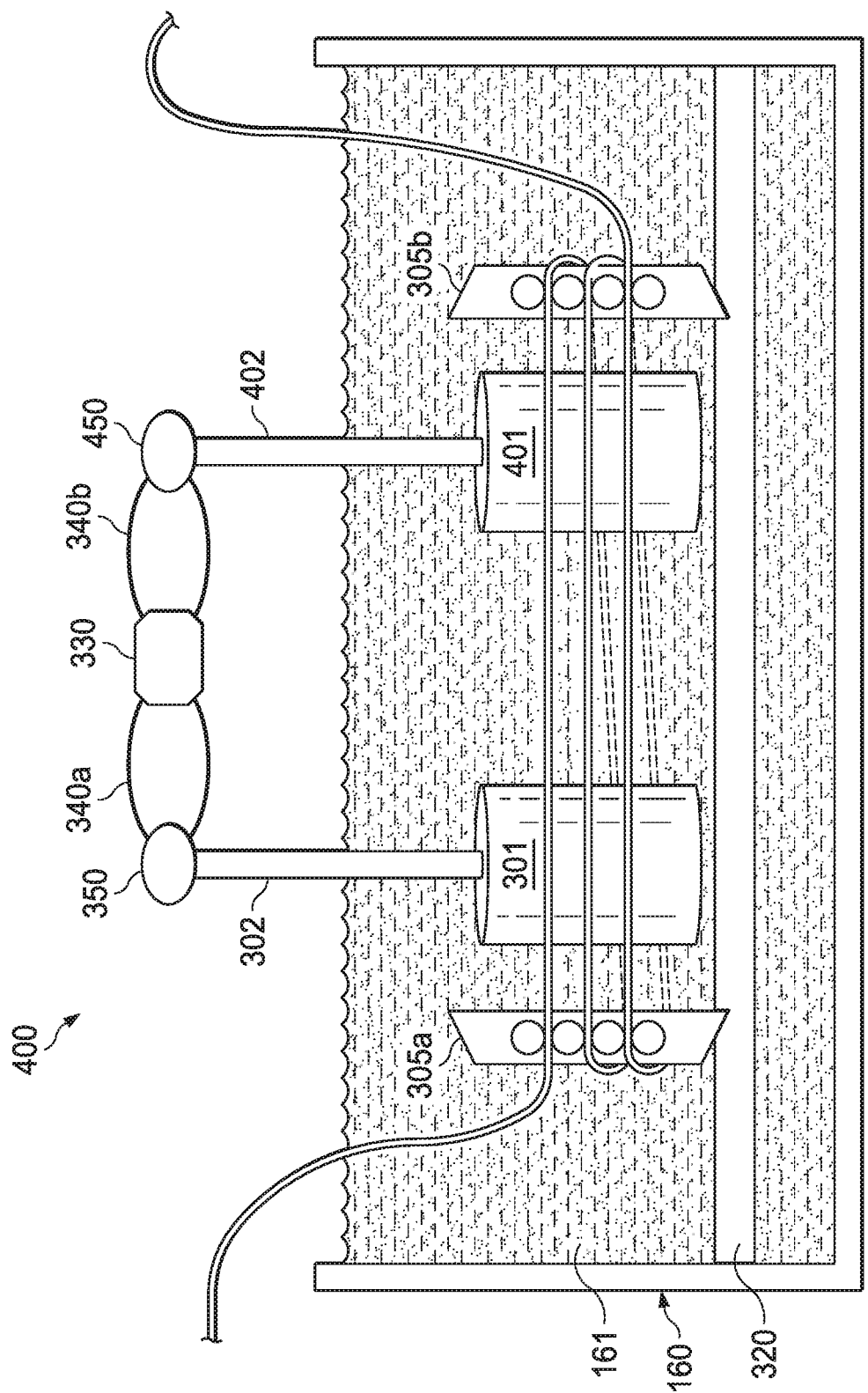
FIG. 4B shows an example schematic of a top down view of a second device to control the impregnation of a first monomer on a hollow fiber.

FIG. 4B shows an example schematic of a top-down view of a comb and dual roller system 400. The first and second rollers 301 and 401 can be held in place by first and second shafts 302 and 402. In some implementations, the shaft 402 passes through the side wall of the first solution bath 160, such that the roller 401 is partially or completely submerged when the first solution bath 160 is filled with a first solution 161. In some implementations, the shaft is suspended above the first water bath 160, such that the roller 401 is partially submerged in the first solution bath 160. In some implementations, the shaft 402 is attached to the solution bath motor 330. In some implementations, the rotation speed of the solution bath motor is controlled by feedback from one or more dancing tension controllers 104. In some implementations, the roller 301 is attached to a pulley 350. The pulley 350 is attached to the solution bath motor 330 by a timing belt 340a. In some implementations, the shaft 402 is attached to a pulley 450. The pulley 450 is attached to the motor 330 by a timing belt 340b.

The comb and dual roller system 400 can include two combs 305a and 305b on outer sides of the rollers 301 and 401 such that the rollers 301 and 401 are between the combs 305a and 305b. The combs are configured as described in system 300. The combs 305a and 305b are used to define a travel path through the first solution 161. The hollow fiber 190 can be threaded in a first direction through a first gap 307a between first pins 308a in the first comb 305a, over the top of the first roller 301, over the top of the second roller 401, through an unoccupied second gap 307b in a second comb 305b, under the second roller 401 in a second direction substantially opposite to the first direction, under the first roller 301, and through a different, unoccupied first gap 307a in the first comb 305a. This threading pattern can continue over the rollers and through the combs. This allows the hollow fiber to travel back and forth multiple times through the first solution 161. The pins 308 function, for example, to keep the hollow fiber 190 from contacting itself or tangling as it passes back and forth through the first solution 161. The pins 308 are configured to have a smooth surface in order to prevent the hollow fiber 190 from sticking to the pins and to allow the hollow fiber 190 to pass easily through the gaps 307. The pins and combs therefore ensure that the hollow fiber is evenly coated and does not snare or tangle during the interfacial polymerization process.

In some implementations, the fiber passes through each gap on the combs successively, which represents the longest travel path. In some implementations, the travel path is shortened by threading the hollow fiber 190 through fewer than each of the gaps 307 in the combs 305. Accordingly, the travel path can be lengthened or shortened as desired. A longer travel path will result in greater impregnation of the first monomer. This system of combs and rollers allows for the control of impregnation of the first monomer.

Both the comb and roller system 300 and the comb and dual roller system 400 can be used to retrofit existing thin-film interfacial polymerization devices. The systems 300 and 400 can be placed in an existing bath, thus increasing the travel distance within the bath. This allows for existing interfacial polymerization setups to be improved by the increase in impregnation control provided by comb and roller systems 300 and 400.

Returning to FIG. 1, the system 100 includes additional baths and components. In some implementations, after the impregnation step in the first solution bath 160, the hollow fiber 190 passes over a transfer roller 109 or series of transfer rollers 109 to a device 165 configured to remove excess first solution. The excess first solution device 165 removes any excess first solution on the hollow fiber 190. Removal of excess first solution can improve the quality of the thin film composite hollow membrane, as any remaining excess first solution can impair the quality of the resulting composite membrane. The excess solution removal device 165 can be compatible with a hollow fiber, and remove excess solution without pressing, crushing, tearing, or otherwise damaging the hollow fiber 190. For example, the excess solution device can use air or inert gas to blow excess first solution off the outer surface of the hollow fiber. Examples of suitable excess solution removal devices are described in patent application U.S. Ser. No. 16/791,986, U.S. Ser. No. 16/791,988 and U.S. Ser. No. 16/791,992, the contents of which are hereby incorporated by reference.

A first example of a suitable excess solution removal device includes an apparatus with housing, an internal hollow passage, and a vacuum port fluidly connected to the internal hollow passage. A hollow fiber that has been immersed in the first solution can be passed through the apparatus from an inlet to an outlet via the internal hollow passage. The hollow fiber passes through the apparatus, and a vacuum connected to the vacuum port is used to flow gas through the hollow passage and past the surface of the hollow fiber. The flowing gas removes excess first solution from the surface of the hollow fiber.

A second example of a suitable excess solution removal device includes an apparatus with housing, an internal hollow passage, and one or more gas ports fluidly connected to the internal hollow passage. A hollow fiber that has been immersed in the first solution can be passed through the apparatus from an inlet to an outlet via the internal hollow passage. The hollow fiber passes through the apparatus, and a compressed gas source connected to the gas ports passes compressed gas or air through the hollow passage and past the surface of the hollow fiber. The flowing gas removes excess first solution from the surface of the hollow fiber.

A third example of a suitable excess solution removal device includes an apparatus with a cylindrical housing. The housing can include a first tubular member and a second tubular member. The second tubular member can define a hollow space. The hollow space can be configured to allow a hollow fiber to pass through the hollow space. The first tubular member and second tubular member define an annular region between an inner surface of the first tubular member and an outer surface of the circumferential wall of the second tubular member. The annular region can be sealed except for a gas inlet port and a plurality of apertures to the hollow space. The first tubular member can be fluidly coupled to a compressed gas inlet port. The compressed gas inlet port can be configured to be coupled to a compressed gas source. Accordingly, compressed gas can flow from the compressed gas port and into the annular space, through the apertures, into the hollow space, and over the hollow fiber. Flowing gas through the apertures removes at least a portion of the first solution from an outer surface of the hollow fiber.

In contrast to these suitable devices, nip rollers, which remove the excess first solution by pressing the support structure between two rollers, are not suitable for hollow fibers. Nip rollers can crush and damage the fibers, therefore when forming a membrane on a hollow fiber, the excess first solution removal device must be suitable for use with hollow fibers.

After removal of the excess first solution 161, the hollow fiber 190 can travel over a transfer roller 109 or a series of transfer rollers 109. The transfer rollers 109 are configured to direct the hollow fiber into the second solution bath 170. The second solution bath 170 contains the second solution 171. The second solution bath may contain a second solution roller 501 to direct and submerge the hollow fiber 190 in the second solution bath 170. The second solution roller 501 can have any diameter suitable to be fully submerged in the second solution bath 170. The second solution roller is configured to have a smooth surface such that the hollow fiber does not stick to the surface or catch on surface irregularities. In some implementations, the roller is made of a non-reactive or non-corrosive material. For example, the roller can be made of stainless steel, high density plastic, or another material that does not react with the solution in the solution bath. Interfacial polymerization occurs between the impregnated first monomer on the hollow fiber and the second solution, creating a thin film composite hollow fiber membrane 191.

In some implementations, the system includes a drying device 175. The drying device dries the thin film composite hollow fiber membrane 191. In some implementations, the drying device removes unreacted second solution 170 from the hollow fiber membrane 191. In some implementations, the drying device 175 cures the thin film composite hollow fiber membrane. The drying device 175 can include, for example, an air drying tower. The air drying tower can be configured to evaporate unreacted second solution, and to thermally cure the thin film composite membrane. The air drying tower can include a heat gun or a dryer. The heat supplied by the air drying tower can reach temperatures of sufficient to dry and cure the thin film composite hollow fiber membrane, for example, temperatures up to 180° C.

The thin film composite hollow fiber membrane 191 then travels over a transfer roller 109 or a series of transfer rollers 109. In some implementations, the thin film composite hollow fiber membrane 191 travels over a second dancing tension controller 104b.

In some implementations, after the thin film polymerization reaction or passing through the drying device, the thin film composite hollow fiber membrane travels over a transfer roller 109 or transfer rollers 109. The transfer rollers 109 are configured to direct the thin film composite hollow fiber membrane 191 to the product roller 601. The product roller 601 can be a drum, cylinder or bobbin. The thin film composite hollow fiber membrane 191 is wound around the product roller 601. In some implementations, the product roller 601 is configured to be partially or completely submerged in a second water bath 180. The support 601 can be attached to a shaft 602. In some implementations, the shaft passes through the wall of the second water bath. The shaft 602 can be configured to be at a height, relative to the bottom of the bath, such that the second support roller 601 is partially or completely submerged when the bath is filled with water 181. The rotation of the support 601 can be driven by a third motor 630. In some implementations, the third motor 630 rotates the product roller 601 at the same speed as all other motors in the system, which maintains the constant tension on the hollow fiber 190 and thin film composite hollow fiber membrane 191 and prevents unnecessary stress or damage to the fiber. In some implementations, the third motor 630 rotates the product roller 601 at a variable speed. For example, as the thin film hollow fiber membrane 191 winds around the product roller 601, the cumulative diameter of the product roller 601 and the thin film composite hollow fiber membrane 191 increases. Therefore, to prevent a pulling stress on the hollow fiber, the rotation speed of the product roller 601 can decrease over time. This decrease in speed can be mediated by feedback from a dancing tension controller 104.

The second water bath 180 maintains the thin film composite hollow fiber membrane in a wet state after the interfacial polymerization reaction. In addition, the water in the second water bath can remove unreacted first solution from the thin film composite hollow fiber membrane. In some implementations, the second solution bath 180 is heated to further thermally treat the thin film composite hollow fiber membrane.

After production of the thin film hollow fiber membrane in the above described system, the membrane can then be used in a variety of applications. For example, the membrane can be used in nanofiltration, reverse osmosis, or gas separation.

Figure 5:
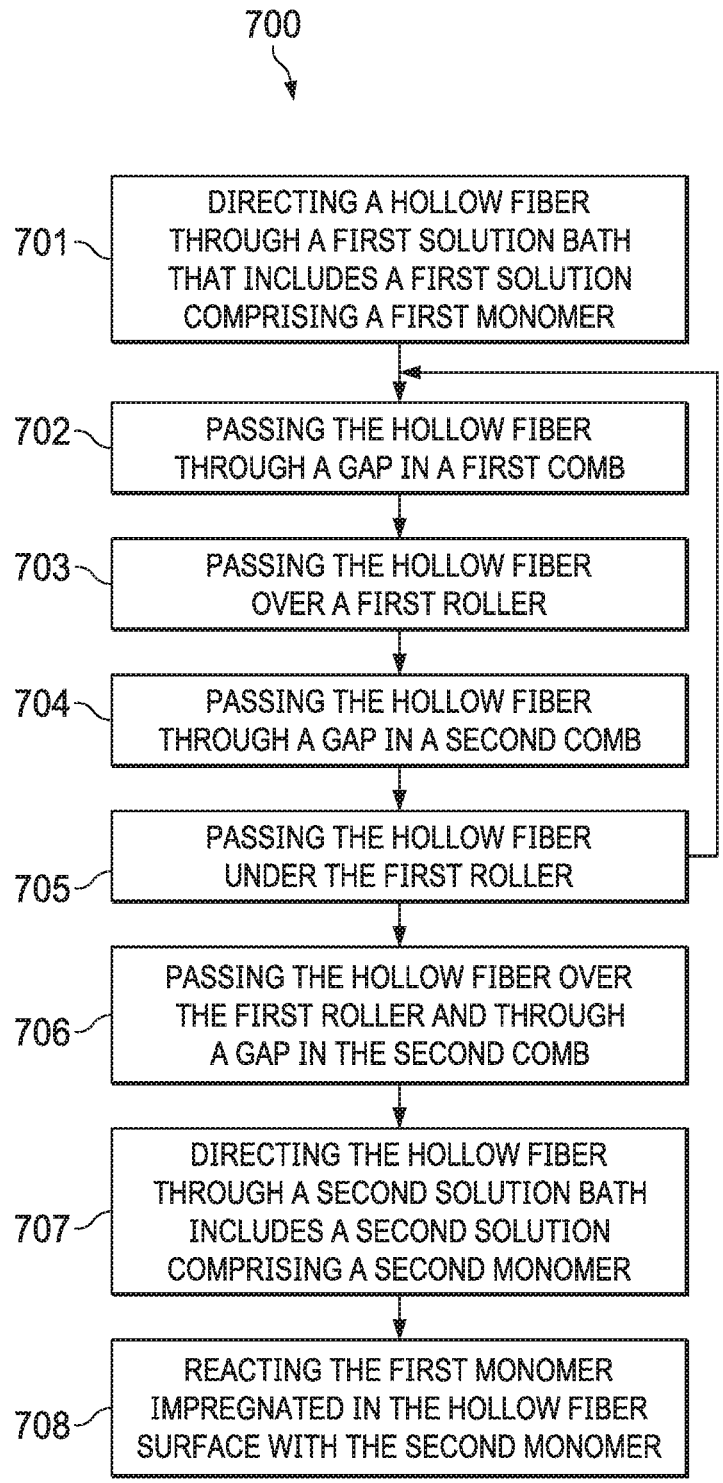
FIG. 5 is flowchart showing an example method of creating a thin film composite hollow fiber membrane.

FIG. 5 is a flowchart of an example of a method 700 for producing thin film composite hollow fiber membranes that includes using the system 300 or 400. At 701, a hollow fiber is directed through a first solution bath that includes a first solution comprising a first monomer. At 702, the hollow fiber is passed through a gap in a first comb. At 703, the hollow fiber is passed over a first roller. At 704, the hollow fiber is passed through a gap in a second comb. At 705, the hollow fiber is passed under the first roller. In some implementations, steps 702 through 705 are repeated a number of times. At 706, the hollow fiber is passed over the first roller and through a gap in the second comb. At 707, the hollow fiber is directed through a second solution bath that includes a second solution. The second solution includes a second monomer. At 708, the first monomer impregnated in the hollow fiber surface is reacted with the second monomer.

In some implementations, the method includes passing the hollow fiber over a first and second roller in the first solution bath. In some implementations, the first solution includes a monomeric arylene polyamine in aqueous solution. For example, the monomeric arylene polyamine can be 1,3-phenylenediamine. In some implementations, the second solution includes an acyl halide. For example, the acyl halide can be 1,3,5 benzenetricarbonyl trichloride. The acyl halide can be dissolved in a second solution that is immiscible with the first solution, for example, the acyl halide can be dissolved in an n-hexane solution. In some implementations, the method includes submerging the hollow fiber in a first water bath before directing the hollow fiber through the first solution bath. The hollow fiber can be wound around a first hollow fiber support roller and partially or completely submerged in the first water bath. In some implementations, the method includes directing the hollow fiber through an excess first solution removal device. In some implementations, the movement of the hollow fiber is driven using a series of rollers. In some implementations, a motor can be used to turn the rollers and drive the movement of the fiber. In some implementations, the hollow fiber passes through an air drying tower after the reaction between the first monomer and the second monomer. In some implementations, the thin film composite hollow fiber membrane is submerged in a second water bath. The thin film composite hollow fiber membrane can be wound around a second hollow fiber roller and partially or completely submerged in the second water bath.

Example 1

The influence of soaking time using the comb and dual rollers system 300 in the first solution on membrane performance was investigated. In the experiment, mesoporous polysulfone was used as the hollow fiber. After spinning and washing, the hollow fiber was placed directly on a hollow fiber roller 101 in a first water bath 150. Driven by a motor, the hollow fiber is pulled through the system, over rollers. The hollow fiber was immersed in a first solution bath containing 1.0% by weight of m-PDA in water. A comb and dual roller system 300 was used to control the timing of the hollow fiber in the first solution. The rollers in system 300 had a diameter of 22 cm and rotated at between 2.5 and 14.0 rotations per minute. This translates to between 7.4 seconds and 1.3 seconds in the first solution bath. After immersion in the first solution, the hollow fiber impregnated with the first monomer was passed through a first solution removal device. The excess solution removal device included housing with an internal hollow passage, and two gas ports fluidly connected to the internal hollow passage. The hollow fiber was passed through the apparatus from an inlet to an outlet via the internal hollow passage. The hollow fiber was passed through the apparatus, and a compressed gas source connected to the gas ports passed compressed air through the hollow passage and past the surface of the hollow fiber to remove excess first solution from the surface of the hollow fiber.

Next, the fiber was immersed in a second solution bath containing 0.05 percent weight by volume of 1,3,5-benzene-tricarbonyl trichloride in n-hexane for approximately 1 second of reaction time The resulting thin film composite hollow fiber membrane was then air-dried at 70° C. After drying, the thin film composite hollow fiber membrane was caulked by coating the fiber with 0.5 percent by weight poly(1-trimethylsiyl-1-propyne) in cyclohexane. The caulked fiber was then tested for gas permeance, as shown in Table 1.

TABLE 1

Effect of soaking time on membrane performance for gas separation[1]

| Soaking time, Rotations Per Minute (RPM) | Gas Permeance, GPU ($10^{-6}cm^3$ (STP)/ $cm^2$/cmHg/sec) | | Selectivity $CO_2/CH_4$ |
| --- | --- | --- | --- |
| | $CO_2$ | $CH_4$ | |
| 14.0 | 68.14 | 119.6 | 0.57 |
| 7.0 | 44.22 | 67.47 | 0.66 |
| 5.0 | 0.67 | 0.02 | 33.50 |
| 2.5 | 0.25 | 0.02 | 12.50 |

[1]Composition of Solution 1: 1.0 wt. % m-PDA in water; Composition of Solution 2: 0.05 wt/vol % TMC in n-Hexane; Air-blowing then drying at 70° C.; Caulking: 0.5 wt. % PTMSP in Cyclohexane; 1GPU-$10^{-6}$ $cm^3$(STP)/$cm^2$/cmHg/sec Reference has been made in detail to certain embodiments of the disclosed subject matter, examples of which are illustrated in part in the accompanying drawings. While the disclosed subject matter has been described in conjunction with the enumerated claims, it will be understood that the exemplified subject matter is not intended to limit the claims to the disclosed subject matter.

The term "about" as used in this disclosure can allow for a degree of variability in a value or range, for example, within 10%, within 5%, or within 1% of a stated value or of a stated limit of a range.

The term "substantially" as used in this disclosure refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "solvent" as used in this disclosure refers to a liquid that can dissolve a solid, another liquid, or a gas to form a solution. Non-limiting examples of solvents are silicones, organic compounds, water, alcohols, ionic liquids, and supercritical fluids.

As used in this disclosure, the term "fluid" refers to liquids and gels, unless otherwise indicated.

As used in this disclosure, "weight percent" (wt %) can be considered a mass fraction or a mass ratio of a substance to the total mixture or composition. Weight percent can be a weight-to-weight ratio or mass-to-mass ratio, unless indicated otherwise.

As used in this disclosure "percent weight by volume" can be considered a fraction or ratio of the weight of a substance to the total volume of the mixture or composition.

A number of implementations of the disclosure have been described. Nevertheless, it will be understood that various modifications may be made without departing from the spirit and scope of the disclosure.

What is claimed is:

1. An apparatus for directing a hollow fiber through a solution bath, the apparatus comprising:
   a roller suspended on a shaft, the roller at least partially submerged in the solution bath, the hollow fiber connected to the roller, wherein the roller is configured to rotate to drive or permit movement of the hollow fiber through the solution bath;
   a solution bath motor connected to the shaft and configured to rotate the roller at a variable speed;
   a first comb comprising a first base and a plurality of first pins, wherein the first pins are arranged on the first base to define a plurality of first gaps between the first pins; and
   a second comb comprising a second base and a plurality of second pins, wherein the second pins are arranged on the second base to define a plurality of second gaps between the pins, and wherein the first comb and the second comb are positioned in the solution bath on opposite sides of the roller and wherein the roller, the first comb, and the second comb are positioned in the solution bath so that the hollow fiber can be directed through a repetitive circular path inside the solution bath.

2. The apparatus of claim 1, wherein the repetitive circular path is defined by a movement through the first comb, over the roller, through the second comb, and under the roller, wherein the first comb, the roller, and the second comb are configured so that the hollow fiber can be passed
   i) through an unoccupied first gap in the first comb;
   ii) over the roller;
   iii) through an unoccupied second gap in the second comb;
   iv) under the roller;
   v) optionally repeatedly through steps i) to iv);
   vi) over the roller and through a final unoccupied second gap in the second comb; and
   vii) out of the solution bath.

3. The apparatus of claim 1, wherein the roller is a first roller and the apparatus comprises a second roller suspended on a second shaft, the second roller at least partially submerged in the solution bath, wherein the second roller is configured to rotate to drive or permit movement of the hollow fiber through the solution bath, and wherein the second roller is positioned in the solution bath between the first comb and the second comb.

4. The apparatus of claim 3, wherein the second shaft is connected to the solution bath motor by a timing belt, and wherein the solution bath motor and the timing belt are configured to rotate the second roller at the same speed as the first roller.

5. The apparatus claim 1, further comprising a guide rail mounted to an inside wall of the solution bath and configured to provide a first attachment point for the first comb and a second attachment point for the second comb, and wherein the first attachment point and the second attachment point are movable along the guide rail.

6. A system for creating thin film composite hollow fiber membranes, comprising:
   a series of transfer rollers configured to direct a hollow fiber through a series of baths, wherein the series of baths comprises
      a first solution bath configured to hold a first solution, wherein the first solution bath comprises
         a solution bath roller, wherein the solution bath roller is at least partially submerged in the first solution, a solution bath motor, wherein the solution bath roller is connected to the solution bath motor by a shaft, and wherein the solution bath motor is configured to rotate the solution bath roller, a first comb, wherein the first comb comprises a first base and a plurality of first pins, wherein the first pins are arranged on the first base to define a plurality of first gaps between the first pins, a second comb, wherein the second comb comprises a second base and a plurality of second pins, wherein the second pins are arranged on the second base to define a plurality of second gaps between the second pins, and wherein the first comb and the second comb are positioned on opposite sides of the solution bath roller and wherein the solution bath roller, the first comb, and the second comb are positioned in the solution bath so that the hollow fiber can be directed through a repetitive circular path inside the solution bath, and a second solution bath configured to hold a second solution.

7. The system of claim 6, wherein the repetitive circular path is defined by a movement through the first comb, over the solution bath roller, through the second comb, and under the solution bath roller, and wherein the first comb, the solution bath roller, and the second comb are configured so that the hollow fiber can be passed
i) through an unoccupied first gap in the first comb;
ii) over the solution bath roller;
iii) through an unoccupied second gap in the second comb;
iv) under the solution bath roller;
v) optionally repeatedly through steps i) to iv);
vi) over the solution bath roller and through a final unoccupied second gap in the second comb; and
vii) out of the first solution bath.

8. The system of claim 6, wherein the solution bath roller is a first solution bath roller and the system comprises a second solution bath roller suspended on a second shaft, the second solution bath roller at least partially submerged in the first solution, wherein the second solution bath roller is configured to rotate to drive or permit movement of the hollow fiber through the first solution bath, and wherein the second solution bath roller is positioned in the solution bath between the first comb and the second comb.

9. The system of claim 8, wherein the second shaft is connected to the solution bath motor by a timing belt, and wherein the solution bath motor is configured to rotate the second solution bath roller at the same speed as the first solution bath roller.

10. The system of claim 6, further comprising an excess solution removal device between the first solution bath and the second solution bath, wherein the excess solution removal device is configured to remove excess first solution from the hollow fiber before the hollow fiber is directed into the second solution bath.

11. The system of claim 6, wherein the series of baths further comprises a first water bath configured to hold water and a second water bath configured to hold water, wherein the first water bath is positioned in the system so that hollow fiber is directed into the first water bath before being directed into the first solution bath, and wherein the second water bath is positioned in the system so that the hollow fiber is directed into the second water bath after the hollow fiber is directed into the second solution bath.

12. The system of claim 11, wherein the first water bath further comprises:
a hollow fiber roller, wherein the hollow fiber roller is at least partially submerged in the water in the first water bath;
a hollow fiber roller shaft, wherein the hollow fiber roller is attached to the hollow fiber roller shaft; and
a water bath motor, wherein the water bath motor is configured to rotate the hollow fiber roller.

13. The system of claim 11, wherein the second water bath further comprises:
a product roller, wherein the product roller is at least partially submerged in the water in the second water bath;
a product roller shaft, wherein the product roller is attached to the product roller shaft; and
a second water bath motor, wherein the second water bath motor is configured to rotate the product roller.

14. The system of claim 6, further comprising one or more tension controllers configured to adjust a speed of the solution bath motor in response to a change in tension of the hollow fiber.

15. The system of claim 14, wherein the tension controller is a dancing tension controller, wherein the dancing tension controller is connected to a resistor and wherein the resistor is configured to send a signal to the solution bath motor to control the speed of the solution bath motor in response to a change in tension of the hollow fiber.

16. The system of claim 6, further comprising a drying device configured to dry the hollow fiber after the hollow fiber has passed through the second solution bath.

17. A method of forming a thin film composite hollow fiber membrane on a hollow fiber, comprising:
providing a first solution bath comprising a first solution;
defining a repetitive circular travel path by a movement of the hollow fiber in the first solution using a first comb, a second comb, and a solution bath roller, wherein the first comb comprises a first base and a plurality of first pins, wherein the first pins define a plurality of first gaps between the first pins, wherein the second comb comprises a second base and a plurality of second pins, wherein the second pins define a plurality of second gaps between the second pins, and wherein the first comb and the second comb are positioned in the first solution bath on opposite sides of the solution bath roller;
directing the hollow fiber through the repetitive circular travel path and impregnating an outer surface of the hollow fiber with a first monomer present in the first solution, wherein directing the hollow fiber through the repetitive circular travel path comprises
i) passing the hollow fiber through an unoccupied first gap in the first comb,
ii) passing the hollow fiber over the solution bath roller,
iii) passing the hollow fiber through an unoccupied second gap in the second comb,
iv) passing the hollow fiber under the solution bath roller,
v) optionally repeating steps i) through iv),
vi) passing the hollow fiber over the roller and through a final unoccupied second gap in the second comb, and
directing the hollow fiber through a second solution bath comprising a second solution, wherein the second solution comprises a second monomer; and reacting the first monomer impregnated in the hollow fiber with the second monomer to generate a thin film composite hollow fiber membrane.

18. The method of claim 17, wherein passing the hollow fiber over the solution bath roller further comprises passing the hollow fiber over a first solution bath roller and over a second solution bath roller, and wherein passing the hollow fiber under the solution bath roller comprises passing the hollow fiber under a first solution bath roller and under a second solution bath roller.

19. The method of claim 17, wherein impregnating the outer surface of the hollow fiber with a first monomer present in the first solution comprises impregnating the outer surface of the hollow fiber with a monomeric arylene polyamine.

20. The method claim of 19, wherein impregnating the outer surface of the hollow fiber with a monomeric arylene polyamine comprises impregnating the outer surface of the hollow fiber with 1,3-phenylenediamine.

21. The method of claim 17, wherein directing the hollow fiber through a second bath comprising a second solution comprises directing the hollow fiber through a second solution comprising an acyl halide.

22. The method of claim 21, wherein directing the hollow fiber through a second solution comprising an acyl halide comprises directing the hollow fiber through a second solution comprising 1,3,5-benzenetricarbonyl trichloride.

23. The method of claim 17, further comprising:
submerging the hollow fiber in a first water bath before directing the hollow fiber through the first solution bath.

24. The method of claim 17, further comprising directing the hollow fiber through an excess first solution removal device prior to directing the hollow fiber through the second solution bath.

25. The method of claim 17, further comprising
maintaining tension in the hollow fiber using at least one dancing tension controller and a solution bath motor connected to the solution bath roller, wherein the solution bath motor is configured to rotate the solution bath roller, wherein the dancing tension controller is configured to send a signal to the solution bath motor in response to a change in tension in the hollow fiber, and wherein the solution bath motor adjusts a speed of the rotation of the solution bath roller in response to the signal.

26. The method of claim 17, further comprising directing the hollow fiber through an air drying tower after reacting the first monomer with the second monomer.

27. The method of claim 17, further comprising submerging the thin film composite hollow fiber membrane in a second water bath.

* * * * *